US011080950B2

(12) United States Patent
McQuade et al.

(10) Patent No.: US 11,080,950 B2
(45) Date of Patent: Aug. 3, 2021

(54) COOPERATIVE VEHICLE DIAGNOSIS SYSTEM

(71) Applicant: ZONAR SYSTEMS, INC., Seattle, WA (US)

(72) Inventors: Charles Michael McQuade, Issaquah, WA (US); Brett Brinton, Seattle, WA (US); Greg Colvin, Maple Valley, WA (US)

(73) Assignee: Zonar Systems, Inc., Seattle, WA (US)

(*) Notice: Subject to any disclaimer, the term of this patent is extended or adjusted under 35 U.S.C. 154(b) by 0 days.

(21) Appl. No.: 15/231,142

(22) Filed: Aug. 8, 2016

(65) Prior Publication Data
US 2016/0342456 A1 Nov. 24, 2016

Related U.S. Application Data

(63) Continuation of application No. 13/219,467, filed on Aug. 26, 2011, now Pat. No. 10,665,040, which is a (Continued)

(51) Int. Cl.
G07C 5/08 (2006.01)
G07C 5/00 (2006.01)
(Continued)

(52) U.S. Cl.
CPC ............ G07C 5/085 (2013.01); F02D 41/22 (2013.01); G06F 3/061 (2013.01); G06F 3/065 (2013.01);
(Continued)

(58) Field of Classification Search
None
See application file for complete search history.

(56) References Cited

U.S. PATENT DOCUMENTS 3,573,620 A 4/1971 Ashley et al.
3,990,067 A 11/1976 Van Dusen et al.
(Continued)

FOREIGN PATENT DOCUMENTS

CA 2138378 A 11/1994
CA 2 388 572 A1 5/2001
(Continued)

OTHER PUBLICATIONS

FOLDOC, Free On-Line Dictionary of Computing, "circular buffer from FOLDOC": http://foldoc.org/circular%20buffer (Year: 2000).*
(Continued)

Primary Examiner — Paul R Fisher

(57) ABSTRACT

Operational data generated and used in a vehicle to control various vehicular systems is temporarily stored in a data buffer in the vehicle. A processor in the vehicle is configured to detect anomalous conditions, which can be based on predefined fault codes or user defined conditions (based on a single parameter or a combination of parameters). Whenever such an anomaly is detected, a diagnostic log is conveyed from the vehicle to a remote location. Such a log will include the detected anomaly, and buffered operational data. In at least one embodiment, the diagnostic log includes buffered operational data collected both before and after the anomaly. The diagnostic log is analyzed at the remote location to diagnose the cause of the anomalous condition, so a decision can be made as to whether the vehicle requires immediate repair, or whether the repair can be scheduled at a later time.

10 Claims, 5 Drawing Sheets

Related U.S. Application Data continuation-in-part of application No. 12/956,961, filed on Nov. 30, 2010, now abandoned, and a continuation-in-part of application No. 13/157,184, filed on Jun. 9, 2011, now Pat. No. 10,600,096, and a continuation-in-part of application No. 13/157,203, filed on Jun. 9, 2011, now abandoned.

(60) Provisional application No. 61/377,865, filed on Aug. 27, 2010.

(51) Int. Cl.
| | |
|---|---|
| G06F 11/07 | (2006.01) |
| F02D 41/22 | (2006.01) |
| G06Q 10/10 | (2012.01) |
| G06Q 10/00 | (2012.01) |
| G06Q 30/06 | (2012.01) |
| G08C 19/00 | (2006.01) |
| G06F 3/06 | (2006.01) |

(52) U.S. Cl.
CPC ............ *G06F 3/067* (2013.01); *G06F 3/0631* (2013.01); *G06F 3/0656* (2013.01); *G06F 11/079* (2013.01); *G06F 11/0739* (2013.01); *G06Q 10/1097* (2013.01); *G06Q 10/20* (2013.01); *G06Q 30/0633* (2013.01); *G07C 5/006* (2013.01); *G07C 5/008* (2013.01); *G07C 5/0808* (2013.01); *G07C 5/0816* (2013.01); *G08C 19/00* (2013.01)

(56) References Cited

U.S. PATENT DOCUMENTS

| | | |
|---|---|---|
| 4,025,791 A | 5/1977 | Lennington et al. |
| 4,092,718 A | 5/1978 | Wendt |
| 4,258,421 A | 3/1981 | Juhasz et al. |
| 4,263,945 A | 4/1981 | Van Ness |
| 4,325,057 A | 4/1982 | Bishop |
| 4,469,149 A | 9/1984 | Walkey et al. |
| 4,602,127 A | 7/1986 | Neely et al. |
| 4,658,371 A | 4/1987 | Walsh et al. |
| 4,763,356 A | 8/1988 | Day, Jr. et al. |
| 4,799,162 A | 1/1989 | Shinkawa et al. |
| 4,804,937 A | 2/1989 | Barbiaux et al. |
| 4,846,233 A | 7/1989 | Fockens |
| 4,897,792 A | 1/1990 | Hosoi |
| 4,934,419 A | 6/1990 | Lamont et al. |
| 4,935,195 A | 6/1990 | Palusamy et al. |
| 5,058,044 A | 10/1991 | Stewart et al. |
| 5,068,656 A | 11/1991 | Sutherland |
| 5,072,380 A | 12/1991 | Randelman et al. |
| 5,120,942 A | 6/1992 | Holland et al. |
| 5,128,651 A | 7/1992 | Heckart |
| 5,204,819 A | 4/1993 | Ryan |
| 5,206,643 A | 4/1993 | Eckelt |
| 5,223,844 A | 6/1993 | Mansell et al. |
| 5,243,323 A | 9/1993 | Rogers |
| 5,321,629 A | 6/1994 | Shirata et al. |
| 5,337,003 A | 8/1994 | Carmichael et al. |
| 5,359,522 A | 10/1994 | Ryan |
| 5,394,136 A | 2/1995 | Lammers et al. |
| 5,399,844 A | 3/1995 | Holland |
| 5,400,018 A | 3/1995 | Scholl et al. |
| 5,442,553 A | 8/1995 | Parrillo |
| 5,459,304 A | 10/1995 | Eisenmann |
| 5,459,660 A | 10/1995 | Berra |
| 5,479,479 A | 12/1995 | Braitberg et al. |
| 5,488,352 A | 1/1996 | Jasper |
| 5,499,182 A | 3/1996 | Ousborne |
| 5,541,845 A | 7/1996 | Klein |
| 5,546,305 A | 8/1996 | Kondo |
| 5,557,254 A | 9/1996 | Johnson et al. |
| 5,557,268 A | 9/1996 | Hughes et al. |
| 5,572,192 A | 11/1996 | Berube |
| 5,585,552 A | 12/1996 | Heuston et al. |
| 5,594,650 A | 1/1997 | Shah et al. |
| 5,596,501 A | 1/1997 | Comer et al. |
| 5,598,534 A | 1/1997 | Haas |
| 5,600,323 A | 2/1997 | Boschini |
| 5,610,596 A | 3/1997 | Petitclerc |
| 5,623,258 A | 4/1997 | Dorfman |
| 5,629,678 A | 5/1997 | Gargano et al. |
| 5,671,141 A | 9/1997 | Smith et al. |
| 5,671,158 A | 9/1997 | Fournier et al. |
| 5,680,328 A | 10/1997 | Skorupski et al. |
| 5,719,771 A | 2/1998 | Buck et al. |
| 5,731,893 A | 3/1998 | Dominique |
| 5,732,074 A | 3/1998 | Spaur et al. |
| 5,742,915 A | 4/1998 | Stafford |
| 5,745,049 A | 4/1998 | Akiyama et al. |
| 5,758,299 A | 5/1998 | Sandborg et al. |
| 5,758,300 A | 5/1998 | Abe |
| 5,781,871 A | 7/1998 | Mezger et al. |
| 5,794,164 A | 8/1998 | Beckert et al. |
| 5,808,565 A | 9/1998 | Matta et al. |
| 5,809,437 A | 9/1998 | Breed |
| 5,815,071 A | 9/1998 | Doyle |
| 5,835,871 A | 11/1998 | Smith et al. |
| 5,838,251 A | 11/1998 | Brinkmeyer et al. |
| 5,839,112 A | 11/1998 | Schreitmueller et al. |
| 5,862,223 A | 1/1999 | Walker et al. |
| 5,867,404 A | 2/1999 | Bryan |
| 5,874,891 A | 2/1999 | Lowe |
| 5,884,202 A | 3/1999 | Arjomand |
| 5,890,061 A | 3/1999 | Timm et al. |
| 5,890,520 A | 4/1999 | Johnson, Jr. |
| 5,913,180 A | 6/1999 | Ryan |
| 5,920,846 A | 7/1999 | Storch et al. |
| 5,922,037 A | 7/1999 | Potts |
| 5,923,572 A | 7/1999 | Pollock |
| 5,942,753 A | 8/1999 | Dell |
| 5,956,259 A | 9/1999 | Hartsell, Jr. et al. |
| 5,974,483 A * | 10/1999 | Ray ........................ G06F 5/10 326/56 |
| 5,995,898 A | 11/1999 | Tuttle |
| 6,009,355 A | 12/1999 | Obradovich et al. |
| 6,009,363 A | 12/1999 | Beckert et al. |
| 6,016,795 A | 1/2000 | Ohki |
| 6,024,142 A | 2/2000 | Bates |
| 6,025,776 A | 2/2000 | Matsuura |
| 6,043,661 A | 3/2000 | Gutierrez |
| 6,054,950 A | 4/2000 | Fontana |
| 6,061,614 A | 5/2000 | Carrender et al. |
| 6,064,299 A | 5/2000 | Lesesky et al. |
| 6,070,156 A | 5/2000 | Hartsell, Jr. |
| 6,078,255 A | 6/2000 | Dividock et al. |
| 6,084,870 A | 7/2000 | Wooten et al. |
| 6,092,021 A | 7/2000 | Ehlbeck et al. |
| 6,107,915 A | 8/2000 | Reavell et al. |
| 6,107,917 A | 8/2000 | Carrender et al. |
| 6,112,152 A | 8/2000 | Tuttle |
| 6,127,947 A | 10/2000 | Uchida et al. |
| 6,128,551 A | 10/2000 | Davis et al. |
| 6,128,959 A | 10/2000 | McGovern et al. |
| 6,169,938 B1 | 1/2001 | Hartsell, Jr. |
| 6,169,943 B1 | 1/2001 | Simon et al. |
| 6,181,994 B1 | 1/2001 | Colson et al. |
| 6,182,275 B1 | 1/2001 | Beelitz et al. |
| 6,199,099 B1 | 3/2001 | Gershman et al. |
| 6,202,008 B1 | 3/2001 | Beckert et al. |
| 6,208,948 B1 | 3/2001 | Klingler et al. |
| 6,236,911 B1 | 5/2001 | Kruger |
| 6,240,365 B1 | 5/2001 | Bunn |
| 6,246,688 B1 | 6/2001 | Angwin et al. |
| 6,253,129 B1 | 6/2001 | Jenkins et al. |
| 6,256,579 B1 | 7/2001 | Tanimoto |
| 6,259,358 B1 | 7/2001 | Fjordbotten |
| 6,263,268 B1 | 7/2001 | Nathanson |
| 6,263,273 B1 | 7/2001 | Henneken et al. |
| 6,263,276 B1 | 7/2001 | Yokoyama et al. |
| 6,278,936 B1 | 8/2001 | Jones |
| 6,285,953 B1 | 9/2001 | Harrison et al. |

(56) References Cited

U.S. PATENT DOCUMENTS

| | | |
|---|---|---|
| 6,295,492 B1 | 9/2001 | Lang et al. |
| 6,330,499 B1 | 12/2001 | Chou et al. |
| 6,338,152 B1 | 1/2002 | Fera et al. |
| 6,339,745 B1 | 1/2002 | Novik |
| 6,362,730 B2 | 3/2002 | Razavi et al. |
| 6,370,454 B1 | 4/2002 | Moore |
| 6,374,176 B1 | 4/2002 | Schmier et al. |
| 6,380,951 B1 * | 4/2002 | Petchenkine ......... G06F 3/1204 715/736 |
| 6,396,413 B2 | 5/2002 | Hines et al. |
| 6,408,232 B1 | 6/2002 | Cannon et al. |
| 6,411,203 B1 | 6/2002 | Lesesky et al. |
| 6,411,891 B1 | 6/2002 | Jones |
| 6,417,760 B1 | 7/2002 | Mabuchi et al. |
| 6,438,472 B1 | 8/2002 | Tano et al. |
| 6,450,411 B1 | 9/2002 | Rash et al. |
| 6,456,039 B1 | 9/2002 | Lauper et al. |
| 6,502,030 B2 | 12/2002 | Hilleary |
| 6,502,303 B2 | 1/2003 | Updegrove et al. |
| 6,505,106 B1 | 1/2003 | Lawrence et al. |
| 6,507,810 B2 | 1/2003 | Razavi et al. |
| 6,526,335 B1 | 2/2003 | Treyz et al. |
| 6,529,723 B1 | 3/2003 | Bentley |
| 6,529,808 B1 | 3/2003 | Diem |
| 6,539,296 B2 | 3/2003 | Diaz et al. |
| 6,578,005 B1 | 6/2003 | Lesaint et al. |
| 6,587,768 B2 | 7/2003 | Chene et al. |
| 6,594,579 B1 | 7/2003 | Lowrey et al. |
| 6,594,621 B1 | 7/2003 | Meeker |
| 6,597,973 B1 | 7/2003 | Barich et al. |
| 6,604,033 B1 | 8/2003 | Banet et al. |
| 6,608,554 B2 | 8/2003 | Lesesky et al. |
| 6,609,051 B2 | 8/2003 | Fiechter et al. |
| 6,609,082 B2 | 8/2003 | Wagner |
| 6,611,740 B2 | 8/2003 | Lowrey et al. |
| 6,614,392 B2 | 9/2003 | Howard |
| 6,615,184 B1 | 9/2003 | Hicks |
| 6,616,036 B2 | 9/2003 | Streicher et al. |
| 6,621,452 B2 | 9/2003 | Knockeart et al. |
| 6,631,322 B1 | 10/2003 | Arthur et al. |
| 6,636,790 B1 | 10/2003 | Lightner et al. |
| 6,664,897 B2 | 12/2003 | Pape et al. |
| 6,671,646 B2 | 12/2003 | Manegold et al. |
| 6,679,110 B2 | 1/2004 | Oka et al. |
| 6,680,694 B1 | 1/2004 | Knockeart et al. |
| 6,708,113 B1 | 3/2004 | Von Gerlach et al. |
| 6,714,859 B2 | 3/2004 | Jones |
| 6,727,818 B1 | 4/2004 | Wildman et al. |
| 6,732,031 B1 | 5/2004 | Lightner et al. |
| 6,732,032 B1 | 5/2004 | Banet et al. |
| 6,744,352 B2 | 6/2004 | Lesesky et al. |
| 6,754,183 B1 | 6/2004 | Razavi et al. |
| 6,754,570 B2 | 6/2004 | Iihoshi et al. |
| 6,768,994 B1 | 7/2004 | Howard et al. |
| 6,801,841 B2 | 10/2004 | Tabe |
| 6,804,606 B2 | 10/2004 | Jones |
| 6,804,626 B2 | 10/2004 | Manegold et al. |
| 6,816,762 B2 | 11/2004 | Hensey et al. |
| 6,834,259 B1 | 12/2004 | Markwitz et al. |
| 6,856,820 B1 | 2/2005 | Kolls |
| 6,876,642 B1 | 4/2005 | Adams et al. |
| 6,879,894 B1 | 4/2005 | Lightner et al. |
| 6,880,390 B2 | 4/2005 | Emord |
| 6,894,617 B2 | 5/2005 | Richman |
| 6,899,151 B1 | 5/2005 | Latka et al. |
| 6,904,359 B2 | 6/2005 | Jones |
| 6,909,947 B2 | 6/2005 | Douros et al. |
| 6,924,750 B2 | 8/2005 | Flick |
| 6,928,348 B1 | 8/2005 | Lightner et al. |
| 6,946,953 B2 | 9/2005 | Lesesky et al. |
| 6,952,645 B1 | 10/2005 | Jones |
| 6,954,689 B2 | 10/2005 | Hanson et al. |
| 6,957,133 B1 | 10/2005 | Hunt et al. |
| 6,959,327 B1 | 10/2005 | Vogl et al. |
| 6,968,259 B2 | 11/2005 | Simons et al. |
| 6,972,668 B2 | 12/2005 | Schauble |
| 6,988,033 B1 | 1/2006 | Lowrey et al. |
| 7,022,018 B2 | 4/2006 | Koga |
| 7,027,955 B2 | 4/2006 | Markwitz et al. |
| 7,048,185 B2 | 5/2006 | Hart |
| 7,068,301 B2 | 6/2006 | Thompson |
| 7,096,193 B1 | 8/2006 | Beaudoin et al. |
| 7,103,460 B1 | 9/2006 | Breed |
| 7,113,127 B1 | 9/2006 | Banet et al. |
| 7,117,121 B2 | 10/2006 | Brinton et al. |
| 7,142,099 B2 | 11/2006 | Ross et al. |
| 7,155,199 B2 | 12/2006 | Zalewski et al. |
| 7,155,322 B2 | 12/2006 | Nakahara et al. |
| 7,171,372 B2 | 1/2007 | Daniel et al. |
| 7,174,243 B1 | 2/2007 | Lightner et al. |
| 7,174,277 B2 | 2/2007 | Vock et al. |
| 7,188,073 B1 | 3/2007 | Tam et al. |
| 7,219,066 B2 | 5/2007 | Parks et al. |
| 7,225,065 B1 | 5/2007 | Hunt et al. |
| 7,228,211 B1 | 6/2007 | Lowrey et al. |
| 7,254,516 B2 | 8/2007 | Case, Jr. et al. |
| 7,343,252 B2 | 3/2008 | Wiens |
| 7,362,229 B2 | 4/2008 | Brinton et al. |
| 7,401,025 B1 | 7/2008 | Lokitz |
| 7,408,480 B2 | 8/2008 | Woo et al. |
| 7,421,321 B2 | 9/2008 | Breed et al. |
| 7,421,334 B2 | 9/2008 | Dahlgren et al. |
| 7,447,574 B1 | 11/2008 | Washicko et al. |
| 7,447,968 B2 | 11/2008 | Ha et al. |
| 7,477,968 B1 | 1/2009 | Lowrey et al. |
| 7,480,551 B1 | 1/2009 | Lowrey et al. |
| 7,490,086 B2 | 2/2009 | Joao |
| 7,500,151 B2 | 3/2009 | Englert et al. |
| 7,523,159 B1 | 4/2009 | Williams et al. |
| 7,532,962 B1 | 5/2009 | Lowrey et al. |
| 7,532,963 B1 | 5/2009 | Lowrey et al. |
| 7,596,437 B1 | 9/2009 | Hunt et al. |
| 7,604,169 B2 | 10/2009 | Demere |
| 7,627,546 B2 | 12/2009 | Moser et al. |
| 7,640,185 B1 | 12/2009 | Giordano et al. |
| 7,650,210 B2 | 1/2010 | Breed |
| 7,672,756 B2 | 3/2010 | Breed |
| 7,672,763 B1 | 3/2010 | Hunt et al. |
| 7,680,594 B2 | 3/2010 | Cabral et al. |
| 7,729,977 B2 | 6/2010 | Xiao et al. |
| 7,778,752 B1 | 8/2010 | Hunt et al. |
| 7,783,507 B2 | 8/2010 | Schick et al. |
| 7,844,500 B2 | 11/2010 | Ran |
| 7,849,149 B2 | 12/2010 | Habaguchi et al. |
| 7,869,906 B2 | 1/2011 | Louch et al. |
| 7,933,841 B2 | 4/2011 | Schmeyer et al. |
| 7,953,530 B1 | 5/2011 | Pederson et al. |
| 7,983,960 B2 | 7/2011 | Rigole |
| 8,099,308 B2 | 1/2012 | Uyeki |
| 8,131,417 B2 | 3/2012 | Picard |
| 8,251,702 B2 | 8/2012 | Marks |
| 8,630,765 B2 | 1/2014 | Chen |
| 8,694,328 B1 | 4/2014 | Gormley |
| 2001/0037281 A1 | 11/2001 | French et al. |
| 2001/0039508 A1 | 11/2001 | Nagler et al. |
| 2001/0047283 A1 | 11/2001 | Melick et al. |
| 2001/0048222 A1 | 12/2001 | Mitchell |
| 2001/0053983 A1 | 12/2001 | Reichwein et al. |
| 2002/0016655 A1 | 2/2002 | Joao |
| 2002/0022979 A1 | 2/2002 | Whipp et al. |
| 2002/0032597 A1 | 3/2002 | Chanos |
| 2002/0038233 A1 | 3/2002 | Shubov et al. |
| 2002/0059046 A1 | 5/2002 | Mifune et al. |
| 2002/0065698 A1 | 5/2002 | Schick et al. |
| 2002/0082912 A1 | 6/2002 | Batachia et al. |
| 2002/0087522 A1 | 7/2002 | MacGregor et al. |
| 2002/0107833 A1 | 8/2002 | Kerkinni |
| 2002/0107873 A1 | 8/2002 | Winkler et al. |
| 2002/0111725 A1 | 8/2002 | Burge |
| 2002/0111897 A1 | 8/2002 | Davis |
| 2002/0120696 A1 | 8/2002 | Mousseau et al. |
| 2002/0133273 A1 * | 9/2002 | Lowrey ................. G01M 15/04 701/29.4 |
| 2002/0133275 A1 | 9/2002 | Thibault |

(56) References Cited

U.S. PATENT DOCUMENTS

| | | |
|---|---|---|
| 2002/0133374 A1 | 9/2002 | Agoni et al. |
| 2002/0150050 A1 | 10/2002 | Nathanson |
| 2002/0160793 A1 | 10/2002 | Pradhan et al. |
| 2002/0177926 A1 | 11/2002 | Lockwood et al. |
| 2002/0178147 A1 | 11/2002 | Arroyo et al. |
| 2002/0183972 A1 | 12/2002 | Enck et al. |
| 2003/0028297 A1 | 2/2003 | Iihoshi et al. |
| 2003/0030550 A1 | 2/2003 | Talbot |
| 2003/0055666 A1 | 3/2003 | Roddy et al. |
| 2003/0061005 A1 | 3/2003 | Manegold et al. |
| 2003/0097218 A1 | 5/2003 | Borugian |
| 2003/0120745 A1 | 6/2003 | Katagishi et al. |
| 2003/0233278 A1 | 12/2003 | Marshall |
| 2004/0049450 A1 | 3/2004 | Lussler |
| 2004/0139047 A1 | 7/2004 | Rechsteiner et al. |
| 2004/0153356 A1* | 8/2004 | Lockwood ............ G06Q 10/20 705/305 |
| 2004/0199412 A1 | 10/2004 | McCauley |
| 2004/0236596 A1 | 11/2004 | Chowdhary et al. |
| 2004/0243464 A1 | 12/2004 | Beck |
| 2005/0038688 A1 | 2/2005 | Collins et al. |
| 2005/0065853 A1 | 3/2005 | Ferreira |
| 2005/0103874 A1 | 5/2005 | Erdman, Jr. |
| 2005/0125117 A1 | 6/2005 | Breed |
| 2005/0149250 A1 | 7/2005 | Isaac |
| 2005/0222756 A1 | 10/2005 | Davis et al. |
| 2005/0228707 A1 | 10/2005 | Hendrickson |
| 2005/0240459 A1 | 10/2005 | Cox |
| 2005/0273250 A1 | 12/2005 | Hamilton et al. |
| 2005/0288830 A1 | 12/2005 | Reeser et al. |
| 2006/0015404 A1 | 1/2006 | Tran |
| 2006/0025966 A1 | 2/2006 | Kanamaru |
| 2006/0052921 A1 | 3/2006 | Bodin et al. |
| 2006/0089767 A1* | 4/2006 | Sowa .................... G01M 15/05 701/31.4 |
| 2006/0100919 A1 | 5/2006 | Levine |
| 2006/0129309 A1 | 6/2006 | Alewine et al. |
| 2006/0184381 A1 | 8/2006 | Rice et al. |
| 2006/0195365 A1 | 8/2006 | Karabetsos |
| 2006/0232406 A1 | 10/2006 | Filibeck |
| 2006/0282364 A1 | 12/2006 | Berg |
| 2007/0050193 A1 | 3/2007 | Larson |
| 2007/0069947 A1 | 3/2007 | Banet et al. |
| 2007/0100519 A1 | 5/2007 | Engel |
| 2007/0124283 A1 | 5/2007 | Gotts et al. |
| 2007/0179709 A1 | 8/2007 | Doyle |
| 2007/0203769 A1 | 8/2007 | Thomas |
| 2007/0208630 A1 | 9/2007 | Chatter et al. |
| 2007/0241874 A1 | 10/2007 | Okpysh et al. |
| 2007/0244797 A1 | 10/2007 | Hinson et al. |
| 2007/0244800 A1 | 10/2007 | Lee et al. |
| 2007/0266180 A1 | 11/2007 | Mitchell et al. |
| 2008/0040129 A1 | 2/2008 | Cauwels et al. |
| 2008/0049123 A1 | 2/2008 | Gloudemans et al. |
| 2008/0119981 A1 | 5/2008 | Chen |
| 2008/0140571 A1 | 6/2008 | Inbarajan et al. |
| 2008/0154489 A1 | 6/2008 | Kaneda et al. |
| 2008/0154712 A1 | 6/2008 | Wellman |
| 2008/0167758 A1* | 7/2008 | Louch .................... H04L 12/66 701/2 |
| 2008/0177653 A1 | 7/2008 | Famolari et al. |
| 2008/0189199 A1 | 8/2008 | Sarid et al. |
| 2008/0228619 A1 | 9/2008 | Locker et al. |
| 2008/0249813 A1 | 10/2008 | Schmeyer |
| 2008/0263016 A1 | 10/2008 | Lokitz |
| 2008/0288830 A1 | 11/2008 | Marinucci |
| 2008/0294556 A1 | 11/2008 | Anderson |
| 2008/0306960 A1 | 12/2008 | Poechmueller et al. |
| 2008/0319665 A1 | 12/2008 | Berkobin et al. |
| 2009/0062978 A1 | 3/2009 | Picard |
| 2009/0069999 A1 | 3/2009 | Bos |
| 2009/0089149 A1 | 4/2009 | Lerner et al. |
| 2009/0150023 A1 | 6/2009 | Grau et al. |
| 2009/0177350 A1 | 7/2009 | Williams et al. |
| 2009/0192854 A1 | 7/2009 | Pietrucha, Jr. et al. |
| 2009/0222200 A1 | 9/2009 | Link, II et al. |
| 2009/0254240 A1 | 10/2009 | Olsen, III et al. |
| 2009/0276115 A1 | 11/2009 | Chen |
| 2010/0010705 A1 | 1/2010 | Duddle et al. |
| 2010/0036595 A1 | 2/2010 | Coy et al. |
| 2010/0088127 A1 | 4/2010 | Betancourt et al. |
| 2010/0106534 A1 | 4/2010 | Robinson et al. |
| 2010/0114423 A1 | 5/2010 | Boss et al. |
| 2010/0217680 A1 | 8/2010 | Fusz et al. |
| 2010/0257104 A1 | 10/2010 | Bundy |
| 2011/0012720 A1 | 1/2011 | Hirschfeld |
| 2011/0118934 A1 | 5/2011 | Lowrey et al. |
| 2011/0225096 A1 | 9/2011 | Cho et al. |
| 2011/0302046 A1 | 12/2011 | Arian |
| 2012/0028680 A1 | 2/2012 | Breed |
| 2012/0053778 A1 | 3/2012 | Colvin et al. |
| 2012/0130844 A1 | 5/2012 | Picard |
| 2012/0136527 A1 | 5/2012 | McQuade et al. |
| 2012/0136743 A1 | 5/2012 | McQuade et al. |
| 2012/0136802 A1 | 5/2012 | McQuade et al. |
| 2016/0071338 A1 | 3/2016 | McQuade et al. |
| 2016/0343177 A1 | 11/2016 | McQuade et al. |
| 2016/0350985 A1 | 12/2016 | McQuade et al. |
| 2017/0076344 A1 | 3/2017 | McQuade et al. |
| 2020/0043068 A1 | 2/2020 | Mcquade et al. |

FOREIGN PATENT DOCUMENTS

| | | |
|---|---|---|
| CA | 2 326 892 C | 6/2005 |
| EP | 0 814 447 B1 | 9/2002 |
| EP | 0 926 020 A3 | 9/2002 |
| EP | 0 755 039 B1 | 12/2002 |
| EP | 1 005 627 B1 | 10/2003 |
| EP | 1 027 792 B1 | 1/2004 |
| EP | 1 067 498 B1 | 5/2004 |
| EP | 1 271 374 B1 | 5/2004 |
| EP | 2 116 968 A1 | 11/2009 |
| JP | 2007-102336 A | 4/2007 |
| JP | 2008-217341 A | 9/2008 |
| KR | 10-2007-0006134 A | 1/2007 |
| KR | 10-2009-0063024 A | 6/2009 |
| KR | 10-2010-0023434 A | 3/2010 |
| KR | 10-0987319 B1 | 10/2010 |
| WO | 97/26750 A1 | 7/1997 |
| WO | 98/03952 A1 | 1/1998 |
| WO | 98/30920 A2 | 7/1998 |
| WO | 03/023550 A2 | 3/2003 |
| WO | 2007/033311 A2 | 3/2007 |
| WO | 2007/092711 A2 | 8/2007 |

OTHER PUBLICATIONS

FOLDOC, Free On-Line Dictionary of Computing, "hardware circular buffer from FOLDOC": http://foldoc.org/hardware+circular+buffer (Year: 2000).*

FOLDOC, Free On-Line Dictionary of Computing, "stack from FOLDOC": http://foldoc.org/FILO (Year: 1995).*

Zdravko Karakehayov, et al. "Embedded Systems Design with 8051 Microcontrollers: Hardware and Software"https://books.google.com/books?id=YiTa-HChn0UC&pg=PA186&dq=ring+buffer&hl=en&sa=X&ved=0ahUKEwjd2sqVvv7dAhXxm-AKHTOPCS8Q6AEIJzAA#v=onepage&q&f=false, p. 186 (Year: 1999).*

Malcolm G. Lane, "Data communications software design", https://books.google.com/books?id=4PpSAAAAMAAJ&q=ring+buffer&dq=ring+buffer&hl=en&sa=X&ved=0ahUKEwjvk46Kv_7dAhXqYN8KHQZNA7w4ChDoAQgtMAE, pp. 246, 247 and 249 (Year: 1985).*

Albright, "Indiana embarks on ambitious RFID roll out—Amusement ride inspection just the first of many applications," *Frontline Solutions*, May 20, 2002, 2 pages.

Anonymous, "Transit agency builds GIS to plan bus routes," *American City & County* 118(4):14-16, 2003.

The Auto Channel, "Nextel, Motorola and Symbol Technologies Offer First Wireless Bar Code Scanner for Mobile Phones," Jun. 11, 2003, 3 pages.

(56) References Cited

OTHER PUBLICATIONS

Black, "OBD II Up Close," *Motor*, pp. 28-34, Jul. 1998.
Business Wire, "TrackingAdvisor with QUALCOMM's FleetAdvisor System: Updated Version Offers Benefit of Visual Display of Vehicles and Routes to Improve Fleet Productivity," *Newswire*, Oct. 27, 2003, 4 pages.
Business Wire, "MIRAS GPS vehicle tracking using the Internet," Nov. 22, 1996, 2 pages.
Child Check-Mate Systems Inc., "What is the Child Check-Mate Safety System?," retrieved from http://www.childcheckmate.com/what.html, retrieved on Apr. 7, 2004, 5 pages.
Colvin et al., "Method and Apparatus for Remote Vehicle Diagnosis," Office Action, dated Oct. 15, 2012, for U.S. Appl. No. 13/219,467, 69 pages.
Colvin et al., "Method and Apparatus for Remote Vehicle Diagnosis," Office Action, dated Sep. 25, 2013, for U.S. Appl. No. 13/219,467, 29 pages.
Colvin et al., "Method and Apparatus for Remote Vehicle Diagnosis," Office Action, dated Mar. 27, 2015, for U.S. Appl. No. 13/219,467, 88 pages.
Detex Corporation, "Detex Announces the Latest Innovation in Guard Tour Verification Technology," Press Release, Jan. 1, 2003, 1 page.
Dwyer et al., "Performance and Emissions of Different Bus Technologies on the city of San Francisco Routes," *Commercial Vehicle Engineering Congress and Exhibition*, 2004, 2 pages.
Extended European Search Report, dated May 9, 2014, for European Application No. 11845242.4-1955 / 2646969, 7 pages.
FleetOwner, "Private fleets moving to wireless communications," May 1, 1997, 4 pages.
FleeTTrackkeR LLC, "*ReporTTrakkeR*," 2002-2003, retrieved from http://www.fleettrakker.com/web/index.isp, retrieved on Mar. 12, 2004, 3 pages.
Ford Motor Company, "2008 My OBD System Operation Summary for 6.4L Diesel Engine," Apr. 28, 2008 Running Change (R42), 2008, 66 pages.
GCS (UK), "News," 2000, retrieved from http://www.gcs.at/eng/news/allgemein.htm, retrieved on Apr. 21, 2005, 2 pages.
GCS (UK), "The PenMaster," retrieved from http:www.gcs.at/eng/produkte/hw/penmaster.htm, retrieved om Apr. 5, 2007, 3 pages.
Guensler et al., "Development of a Comprehensive Vehicle Instrumentation Package for Monitoring Individual Tripmaking Behavior," Technical Specifications and Analysis, GTI-R-99003, Feb. 1999, 31 pages.
IBM Technology, "Terms B," retrieved from http://www-01.ibm.com/software/globalization/terminology/b.html, retrieved on Dec. 11, 2014, 69 pages.
IBM Technology, "Terms R," retrieved from http://www-01.ibm.com/software/globalization/terminology/r.html, retrieved on Dec. 11, 2014, 137 pages.
International Search Report, dated Feb. 9, 2012, for International Application No. PCT/US2011/049470, 7 pages.
International Search Report, dated Jul. 30, 2012, for International Application No. PCT/US2011/062480, 9 pages.
Jenkins et al., "Real-Time Vehicle Performance Monitoring Using Wireless Networking," *Proceedings of 3rd IASTED International Conference on Communications, Internet, and Information Technology*, 2004, 7 pages.
Kurtz, "Indiana's E-Government: A Story Behind Its Ranking," *INContext* 4(1): Jan.-Feb. 2003, 5 pages.
Kwon, "Networking Technologies of In-Vehicle," Seoul National University, Mar. 8, 2000, 44 pages.
Leavitt, "The Convergence Zone," FleetOwner, Jun. 1, 1998, 4 pages.
McQuade et al., "System and Method for Vehicle Maintenance Including Remote Diagnosis and Reverse Auction for Identified Repairs," Office Action, dated Sep. 21, 2012, for U.S. Appl. No. 12/956,961, 45 pages.
McQuade et al., "System and Method for Vehicle Maintenance Including Remote Diagnosis and Reverse Auction for Identified Repairs," Office Action, dated Jun. 28, 2013, for U.S. Appl. No. 12/956,961, 75 pages.
McQuade et al., "System and Method for Vehicle Maintenance Including Remote Diagnosis and Reverse Auction for Identified Repairs," Office Action, dated Dec. 16, 2014, for U.S. Appl. No. 12/956,961, 118 pages.
McQuade et al., "System and Method for Vehicle Maintenance Including Remote Diagnosis and Reverse Auction for Identified Repairs," Office Action, dated Aug. 11, 2015, for U.S. Appl. No. 12/956,961, 28 pages.
McQuade et al., "System and Method for Obtaining Competitive Pricing for Vehicle Services," Office Action, dated Sep. 20, 2012, for U.S. Appl. No. 13/157,184, 32 pages.
McQuade et al., "System and Method for Obtaining Competitive Pricing for Vehicle Services," Office Action, dated Feb. 13, 2014, for U.S. Appl. No. 13/157,184, 53 pages.
McQuade et al., "System and Method for Obtaining Competitive Pricing for Vehicle Services," Office Action, dated Sep. 8, 2015, for U.S. Appl. No. 13/157,184, 69 pages.
McQuade et al., "System and Method for Obtaining Competitive Pricing for Vehicle Services," Office Action, dated Jul. 30, 2013, for U.S. Appl. No. 13/157,203, 30 pages.
McQuade et al., "System and Method for Obtaining Competitive Pricing for Vehicle Services," Office Action, dated Jan. 22, 2014, for U.S. Appl. No. 13/157,203, 29 pages.
McQuade et al., "System and Method for Obtaining Competitive Pricing for Vehicle Services," Office Action, dated Feb. 12, 2014, for U.S. Appl. No. 13/157,203, 31 pages.
McQuade et al., "System and Method for Obtaining Competitive Pricing for Vehicle Services," Office Action, dated Oct. 7, 2014, for U.S. Appl. No. 13/157,203, 59 pages.
McQuade et al., "System and Method for Obtaining Competitive Pricing for Vehicle Services," Office Action, dated Sep. 23, 2015, for U.S. Appl. No. 13/157,203, 34 pages.
Miras, "About SPS Technologies," May 7, 1999, retrieved from http://replay.waybackmachine.org/19990507195047/http://www.miras.com/html/about_sps_technologies . . . , retrieved on Sep. 29, 2010, 1 page.
Miras, "How MIRAS Works," Apr. 29, 1999, retrieved from http://replay.waybackmachine.org/19990429144910/http://miras.com/html/products.html, retrieved on Sep. 29, 2010, 1 page.
Miras, "Miras 4.0 Screenshot," May 7, 1999, retrieved from http://replay.waybackmachine.org/19990507205618/http://www.miras.com/html/largescreen.html, retrieved on Sep. 29, 2010, 1 page.
Miras, "MIRAS Unit," May 4, 1999, retrieved from http://replay.waybackmachine.org/19990504052250/http://www.miras.com/html/1000unit.html, retrieved on Sep. 29, 2010, 1 page.
Miras, "Monitoring Vehicle Functions," Apr. 27, 1999, retrieved from http://replay.waybackmachine.org/19990427152518/http://www.miras.com/html/monitoring.html, retrieved on Sep. 29, 2010, 1 page.
Miras, "Remote Control," Apr. 29, 1999, retrieved from http://replay.waybackmachine.org/19990429145717/http://miras.com/html/remote_control.html, retrieved on Sep. 29, 2010, 1 page.
Miras, "Tracking & Monitoring Software," Apr. 29, 1999, retrieved from http://replay.waybackmachine.org/19990429160322/http://miras.com/html/software.html, retrieved on Apr. 29, 2010, 1 page.
The Proxi Escorte, "The Data Acquisition Unit Escorte," retrieved from http://www.gcs.at/eng/produckte/hw/escorte.htm, retrieved on Apr. 21, 2005, 4 pages.
Security Management Online—Bulletin Board, Member: Quaan, "Guard Tour Systems," posted Sep. 16, 2003, 1 page.
Senger, "Inside RF/ID: Carving a Niche Beyond Asset Tracking—Systems integrator SPEC designs innovative RF/ID solutions beyond asset tracking for food processing plant and heavy-equipment dealer," *Business Solutions*, Feb. 1999, 5 pages.
Sterzbach, "A Mobile Vehicle On-Board Computing and Communication System," *Comput. & Graphics* 20(4):659-667, 1996.
Tiscor, "Inspection Manager," 2004, 19 pages.
Tiscor, "Inspection Manager 6.0, User Guide," 2004, 73 pages.

(56) References Cited

OTHER PUBLICATIONS

"Tracking out of route: software helps fleets compare planned routes to actual miles. (Technology)," *Commercial Carrier Journal* 162(10):S46(2), 2005. (4 pages).
Tsakiri et al., Monitoring with GPS and GLONASS, *Journal of Navigation* 51(3):382-393, 1998.
Tuttle, "Digital RF/ID Enhances GPS," *Proceedings of the Second Annual Wireless Symposium*, pp. 406-411, 1994. (6 pages).
U.S. Environmental Protection Agency, "On-Board Diagnostics (OBD)—Frequent Questions," retrieved from http://web.archive.org/web/20050915205926/http://www.epa.gov/obd/questions.htm, retrieved on Dec. 9, 2014, 4 pages.
Want, "RFID—A Key to Automating Everything," *Sci. American*, pp. 58-65, 2004. (10 pages).
Zujkowski, "Savi Technology, Inc.—Savy Security and Productivity Systems," ATA Security Forum, Chicago, IL, May 15, 2002, 21 pages.
Frost & Sullivan, "Remote Vehicle Diagnostics—The Quiet Revolution Signalling a New Era for Auto Makers," Oct. 10, 2002, URL=http://www.frost.com/prod/servlet/press-release-print.pag?docid=KMEE-5ESE9W, download date Apr. 26, 2019, 2 pages.

\* cited by examiner

COOPERATIVE VEHICLE DIAGNOSIS SYSTEM

This application is a continuation of copending patent application Ser. No. 13/219,467, filed on Aug. 26, 2011. Ser. No. 13/219,467 is based on a prior provisional application, Ser. No. 61/377,865, filed on Aug. 27, 2010, the benefit of the filing date of which is claimed under 35 U.S.C. § 119(e). Ser. No. 13/219,467 is further a continuation-in-part of patent application Ser. No. 12/956,961, filed on Nov. 30, 2010 (now abandoned), copending patent application Ser. No. 13/157,184, filed on Jun. 9, 2011, and patent application Ser. No. 13/157,203, also filed on Jun. 9, 2011, the benefits of the filing dates of which are claimed under 35 U.S.C. § 120.

BACKGROUND

Today's vehicles are equipped with many different types of data collection and processing components. Much of the data collected by the data collection components is used to control the operation of the vehicle. For example, data collected by oxygen sensors is used to control the amount of fuel introduced into the engine, to avoid providing an overly rich fuel mixture that would result in decreased fuel efficiency and increased emissions.

Two broad classes of data include operational data and fault code data. As used herein and the claims that follow, the term operational data encompasses data that is used to control the operation of the vehicle, such as the data from oxygen sensors as noted above (data which is used by one or more vehicle controllers as feedback for controlling some aspect of the vehicles operation), or data that is simply generated during the operation of the vehicle (some vehicles generate operational data that is not used by any vehicle component during routine vehicle operation, but is rather used by diagnostic or service equipment during vehicle servicing or maintenance). In general, operational data is not stored, but rather is generated, contemporaneously used (either to control various vehicular systems or to provide data to diagnostic or service equipment during vehicle servicing), and then discarded. Exemplary operational data include, but is not limited to, engine coolant temperature, engine speed, oxygen levels, throttle position, brake temperature, vehicle speed, brake position, and gearbox parameters. Much of this data is collected very frequently, some types of operational data being collected multiple times per second. The sheer quantity of operational data being generated by the various vehicle components and subsystems makes storing or archiving all of such operational data problematical. Some vendors do provide data logging systems for temporary use in vehicles, where all the operational data generated by the vehicle is stored for later analysis, but such data logging systems are not designed for long term use.

Fault code data somewhat addresses the problem of storing the enormous quantity of operational data generated by vehicles. Fault codes corresponding to specific undesirable operating parameters are predefined. A processor in the vehicle monitors the operational data as it is generated, and whenever an operating parameter corresponding to a specific predefined fault code is detected, the fault code is stored in a memory in the vehicle. The fault code is generally a numeric or alphanumeric value that can be stored using very little memory resources. For example, the number 11 can be defined as a fault code for the following condition: battery sensing voltage drops below 4 or between 7 and 8 volts for more than 20 seconds. Fault codes can be retrieved and used to diagnose vehicle problems. Even with the data provided by fault codes, accurate diagnosis of complex or unusual vehicular system failures can be problematical.

It would be desirable to provide a vehicular diagnostic method and apparatus that provided more contextual data than available based on fault codes alone, which do not rely on storing all of the operational data produced by a vehicle.

SUMMARY

This application specifically incorporates by reference the disclosures and drawings of each patent application identified above as a related application.

The concepts disclosed herein encompass temporarily storing operational data in a buffer in the vehicle, rather than simply discarding the operational data, and then archiving such buffered operational data whenever a fault code is generated. Such archived operational data combined with the fault code will provide a contextually rich data set that will greatly facilitate diagnosis of vehicle problems. The term combining does not require the archived or saved operational data and the fault code data to be stored in the same file location or data packet, rather, the term combining is used to indicate that a contextual link between the archived operational data and the fault code is generated, so that even if the archived operational data and the fault code are not stored together in a single file or data packet, the archived operational data corresponding to a particular fault code can be differentiated from archived operational data corresponding to a different fault code. Time indexing can be used to correlate specific archived operational data to specific fault codes, if the different types of data are to be stored separately.

In at least one exemplary embodiment, the archived operational data corresponding to a particular fault code is ring buffered operational data, which includes operational data collected both before and after the fault code is detected. The amount of operational data before and after the fault code can be defined as desired, and need not be identical (that is, some users may prefer relatively more operational data after a fault code is detected, and relatively less operational data before a fault code is detected, or vice versa). In at least one exemplary embodiment, systems implementing the concepts disclosed herein are configured to enable the temporal extent of such a ring buffer to be a user adjustable parameter.

In at least one exemplary embodiment, the contextually (and temporally) linked buffered operational data and fault code data are conveyed in real-time to a remote computing device, so that a diagnosis of a vehicle problem causing the generation of the fault code can occur while the vehicle is operational. Rapid diagnosis of problems can lead to the prevention of damage to the vehicle caused by continuing to operate the vehicle after a malfunction is detected, where the diagnosis indicates that continued operation of the vehicle would result in such damage. In such circumstances, the driver of the vehicle can be contacted to ensure that continued operation of the vehicle does not occur. If the diagnosed problem is relatively minor, the operator of the vehicle can be contacted with less urgency to arrange for a repair. In an exemplary, but not limiting embodiment, where continued operation of the vehicle is not likely to result in damage, the results of the vehicle diagnosis are forwarded to the vehicle operator, service for the vehicle is scheduled, and parts required for the service are ordered, all while the vehicle continues to operate.

It should be recognized that the fault codes discussed above represent the detection of an anomalous vehicle condition identified by analyzing the operational data. The concepts disclosed herein encompass embodiments where real time analysis of the vehicle operational data at the vehicle indicates an anomalous condition exists, even when the anomalous condition does not correspond to a fault code predefined by the vehicle manufacturer. The controller in the vehicle tasked with the analysis of operational data to detect an anomalous condition can be configured as desired to detect specific conditions that a user has determined represents an anomaly. Thus, in at least one exemplary embodiment, buffered operational data is conveyed to a remote computing device whenever a user defined operating parameter is detected. In essence, this enables a user to define a custom fault code library (note that prior art fault codes are tied to specific operating parameters, however, prior art fault codes are predefined at the vehicle manufacturer level, and are not user modifiable or user defined). This concept is referred to herein and in the claims that follow as a user defined fault code. Such user defined fault codes can include any user defined single operational parameter, or a combination of user defined operational parameters, that are unique from the fault codes defined at the vehicle manufacturer level. In at least one exemplary embodiment, systems implementing the concepts disclosed herein are configured so that user defined fault codes can be defined and implemented while the vehicle is operational. In at least one exemplary embodiment, user defined fault codes are generated at a remote computing device attempting to acquire additional information to be used to diagnose a vehicle, where the user defined fault code is uniquely defined based on buffered operational data conveyed to the remote computing device while the vehicle is operating.

It should be recognized that the concepts disclosed herein encompass embodiments in which the detection of an anomalous conditions triggers the transmission of the buffered operational data collected proximate the detection of the anomalous condition (and data defining the detected anomaly) to the remote computing device for analysis immediately (i.e., in real-time), or after only a relatively brief delay. In at least one exemplary embodiment, a wireless data link, such as a cellular data link, is used to transmit such data from the vehicle to the remote computing device. In at least one embodiment, if a data link cannot be established between the vehicle and the remote computing device to transmit the buffered operational data and data defining the detected anomaly immediately, then the buffered operational data collected proximate the detection of the anomalous condition (and the data defining the anomalous condition detected) can be stored at the vehicle and sent to the remote computing device when a data link can be established. The phrase buffered operational data collected proximate the detection of the anomalous condition is intended to encompass: (1) buffered operational data collected for a predefined period after the anomaly has been detected; (2) buffered operational data collected for a predefined period before the anomaly was detected; and (3) buffered operational data collected for a predefined period after the anomaly has been detected combined with buffered operational data collected for a predefined period before the anomaly was detected. Because the buffer temporarily stores operational data, some amount of operational data acquired before the anomalous event is detected is available (the amount of operational data available being a function of a size of the buffer).

In at least one exemplary embodiment, the buffered operational data includes operational data that is automatically broadcast by the vehicle while the vehicle is operating. In at least one exemplary embodiment, the buffered operational data includes operational data that must be specifically requested. In yet another exemplary embodiment, the buffered operational data includes both operational data that is automatically broadcast by the vehicle while the vehicle is operating and operational data that must be specifically requested. In general, operational data that must be requested is operational data that can be generated upon request (such as throttle position data), but is not data that normally generated during routine vehicle operations.

In addition to being implemented as a method, the concepts disclosed herein can also be implemented as a non-transitory memory medium, storing machine instructions that when executed by a processor implement the method, and by a system for implementing the method. In such a system, the basic elements include a vehicle, operational data collection components in the vehicle, a memory (i.e., a buffer) at the vehicle in which some amount of operational data is temporarily stored, and a vehicle processor for monitoring the operational data to detect an anomalous condition (i.e., to detect a fault code, manufacturer defined or user defined). Where vehicle diagnosis is to be performed in real-time at remote locations, a communication link (preferably bidirectional, so that in the event that the diagnosis indicates that continued operation is ill advised, the driver of the vehicle can be contacted) for communicating with a remote computing device is included. It should be recognized that these basic elements can be combined in many different configurations to achieve the exemplary concepts discussed above. Thus, the details provided herein are intended to be exemplary, and not limiting on the scope of the concepts disclosed herein.

The above noted methods are preferably implemented by a processor (such as a computing device implementing machine instructions to implement the specific functions noted above) or a custom circuit (such as an application specific integrated circuit).

The term real-time as used herein and the claims that follow is not intended to imply the data is transmitted instantaneously, rather the data is collected over a relatively short period of time (over a period of seconds or minutes), and transmitted to the remote computing device on an ongoing basis (transmission of the buffered operational data being triggered by the detection of a fault or anomaly), as opposed to storing the data at the vehicle for an extended period of time (hour or days), and transmitting an extended data set to the remote computing device after the data set has been collected.

The concepts disclosed herein encompass a system where the above identified data operational data collection components, the data buffer (where some amount of operational data is temporarily stored, rather than being discarded), the processor (for analyzing the operational data to detect an anomalous condition), and the data link (for conveying the buffered operational data and the detected anomalous condition to a remote computing device for analysis) are included in a plurality of enrolled vehicles. Such a system includes a remote computing device (either an individual computing device, or a network of such devices), where the buffered operational data and the data defining the anomalous condition (such as a fault code) can be stored or analyzed (i.e., diagnosed). In one exemplary, but not limiting embodiment, vehicle position data and/or inspection data is collected from enrolled vehicles and stored at a first server, operated by a first entity, for use by the operator of the vehicle. Such data is collected during normal operation of the vehicle, and sent to the first server during normal operation of a vehicle. In the event that an anomalous condition is detected, the buffered operational data and the data defining the anomalous condition are sent from the vehicle to the first server. The first entity operating the first server then conveys the buffered operational data and the data defining the anomalous condition to a second server operated by a second entity. The second entity then analyzes the buffered operational data and the data defining the anomalous condition and determines the cause of the anomalous condition. The vehicle operator can then be contacted to arrange servicing of the vehicle. In an exemplary embodiment, the second entity is the manufacturer of the vehicle or the vehicle power plant.

The concepts disclosed herein also encompass embodiments in which each enrolled vehicle includes a position tracking component (such as a global position satellite (GPS) tracking device), along with the data buffer, the data link to the remote computing device, and the processor for detecting the anomalous condition (or responding to the detection of the anomalous condition by using the data link to convey the buffered operational data to a remote computing device for analysis). In at least one exemplary embodiment, such components are incorporated into a diagnostic or telematics device also including the position tracking component.

The concepts disclosed herein also encompass embodiments in which techniques are implemented to reduce an amount of buffered operational data conveyed to a remote computing device for analysis. Particularly where the data link from the vehicle to the remote computing device is wireless (such as cellular or satellite based communications), data transmission rates represent a cost that can be controlled. The concepts disclosed herein encompass a variety of filtering techniques that can be used to determine if a particular condition exists, such that when such a predefined condition exists, the buffered operational data will not be sent to the remote computing device, even if an anomalous condition is detected. One such filtering technique is based on detecting (using a position sensing component) a location of the vehicle at startup. If that location corresponds to a repair facility or service center, then the automated buffered operational data transmission functionality can be turned off (as the vehicle will likely be coupled to a diagnostic device at the service center, such that the remote diagnostic function is not needed). Such locations can be stored in a memory at the vehicle, or more preferably, the vehicle can communicate its location at start up to the remote computing device, which has access to the locations of such service centers. The remote computing device then determines if the processor in the vehicle responsible for controlling transmission of the buffered operational data to the remote computing device should be instructed not to transmit such data. Another such filter technique is based on analyzing whether the same anomalous conditions are detected in about the same geographic position and/or within a predefined time period (which can indicate that the vehicle is being driven around a service facility trying to replicate an intermittent fault). Another technique that can be used to reduce the amount of buffered operational data that is wirelessly conveyed to a remote computing device is to ensure that duplicate information, related to the same anomalous condition, is not sent time and time again. In at least one embodiment, an occurrence counter in a diagnostic trouble code (DTC) is analyzed to determine if a particular fault code is a reoccurring event that can be ignored to minimize an amount of data that is transmitted wirelessly.

The concepts disclosed herein also encompass embodiments in which the processor controlling the collection and transmission of buffered operational data is configured to either ignore operational data generated during an initial start-up of the vehicle (referred to as settling time. This technique will result in no buffered operational data and anomalous condition data being wirelessly conveyed to a remote computing device until after a predetermined settling time has elapsed.

It should be recognized that there is a temporal connection between the buffered operational data to be sent to the remote computing device and the detection of the anomalous event. Depending upon user preference, the buffered operational data sent to the remote computing device can be: (1) operational data collected before the anomaly; (2) operational data collected after the anomaly; and (3) a combination of operational data collected before the anomaly and after the anomaly.

The concepts disclosed herein also encompass embodiments in which once buffered operational data and data defining an anomalous event are wirelessly conveyed to a remote computing device, a processor in the vehicle is configured to monitor dashboard lamps, to determine if any warning indicator lamps on the vehicle dashboard change in response to the recently detected anomalous condition. When such a lamp status change (i.e., from off to on, or from amber/yellow to red, indicating an escalation) is detected, that information is wirelessly transmitted to the remote computing device to which the buffered operational data and anomalous condition data were previously sent.

The concepts disclosed herein also encompass embodiments in which a controller in the vehicle is configured to enable an operator of the vehicle to manually trigger the transmission of buffered operational data to the remote computing device. This can be used to enable an operator who is concerned that something unusual might be occurring in regard to vehicle operation, so that buffered operational data can be analyzed at a remote computing device to determine if there really is an operational issue with the vehicle. In such circumstances, the processor in the vehicle tasked with monitoring the operational data to detect an anomalous condition may not have detected such an anomalous condition, in which case only the buffered operational data will be conveyed to the remote computing device (i.e., data defining the anomalous condition will not be present, thus will not be sent to the remote computing device). In such a data transmission of buffered operational data, an indication that the operator of the vehicle triggered the data transmission can be included, so the analysis of the buffered operational data at the remote computing device can proceed with the understanding that the operator of the vehicle suspects a problem exists, even if an anomalous condition has not be detected at the vehicle by the vehicle hardware monitoring the operational data for such an anomalous condition. The vehicle can be equipped with a user input specifically configured to enable the vehicle operator to trigger the transmission of the current buffered operational data to the remote computing device (i.e., a button, rocker panel, switch or other user input that is added to the vehicle). In at least one embodiment, an existing operator input element is modified to support such a triggering function. For example, a control device used to control vehicle equipment such as a headlight or radio can be used as a trigger, if the processor controlling the transmission of the buffered operational data is coupled to the control device, and configured to respond to a certain input pattern from the control device (i.e., the control device is manipulated by the operator in a predefined and unusual pattern, such as repeatedly manipulating the control device in a specific and unusual sequence not normally employed in routine vehicle operations). In at least one embodiment, the controller responsible for sending the buffered operational data to the remote computing device is configured to recognize repeatedly turning the radio on and off in a specific predefined pattern as an operator trigger signal, requiring the processor to use the data link to upload the contents of the data buffer to the remote computing device.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figure 1:
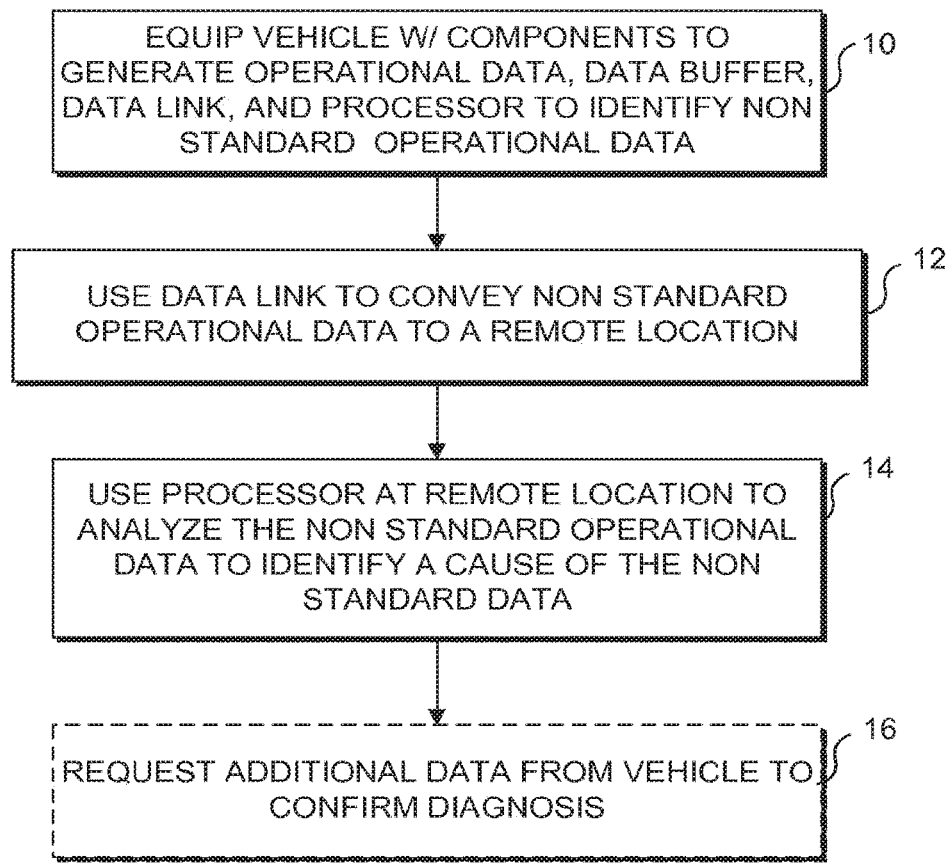
FIG. 1 is a high level logic diagram showing exemplary overall method steps implemented in accord with the concepts disclosed herein to remotely diagnose an abnormal vehicle parameter in real-time.

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Further, it should be understood that any feature of one embodiment disclosed herein can be combined with one or more features of any other embodiment that is disclosed, unless otherwise indicated.

As used herein and in the claims that follow, a reference to an activity that occurs in real-time is intended to refer not only to an activity that occurs with no delay, but also to an activity that occurs with a relatively short delay (i.e., a delay or lag period of seconds or minutes, but with less than an hour of lag time).

FIG. 1 is a high level flow chart showing the overall method steps implemented in accord with one aspect of the concepts disclosed herein, to convey data defining an anomalous vehicle condition along with operational data (collected from the vehicle proximate to the detection of the anomaly) to a remote computing device, so that the cause of the anomaly can be diagnosed in real-time. Vehicle fault codes represent an exemplary type of anomaly. In the prior art, fault codes are used to facilitate diagnosis of vehicle problems, however, the operational data discussed herein is not used in addition to the fault codes to diagnose vehicle problems. Providing such operational data in addition to the data defining the anomaly (such as a fault code) will facilitate more accurate diagnoses.

Referring to FIG. 1, in a block 10, each vehicle enrolled in the diagnostic system is equipped with components to collect operational data, a data buffer in which operational data is temporarily stored, a processor to detect anomalous conditions (such as anomalous conditions corresponding to predefined fault codes), and a data link to convey the data defining the anomalous condition and contents of the data buffer to a remote computing device for diagnosis. As noted above, a majority of vehicles manufactured today already include components to collect operational data during operation of the vehicle. Such data is used during operation of the vehicle, to provide feedback to control many vehicle systems, including but not limited to engine fuel supply components, vehicle braking components, vehicle cooling components, and vehicle transmission components. According to the concepts disclosed herein, such vehicles are modified to include a data buffer in which this operational data is temporarily stored. Conventionally, such operational data is generated, used to control operation of the vehicle (or used for diagnostic purposes when the vehicle is coupled to a diagnostic unit in a service bay), and then discarded. Further modifications include configuring a processor in the vehicle to convey detected vehicle anomalies and the contents of the data buffer when the anomaly is detected to the remote computing device for diagnosis. The data buffer can be configured as desired to include operational data collected before the anomaly occurs, after the anomaly occurs, or both. In an exemplary embodiment, a temporal extent of the operational data conveyed to the remote computing device along with the data defining the anomaly, both before and after the anomaly occurs, is a user definable parameter. In at least one embodiment, the buffer collects several minutes of data, in a first in, first out type data buffer. It should be recognized that such an amount of data is exemplary, and not limiting. From a diagnostic perspective, the more data the better. From an implementation standpoint, larger data buffers will cost somewhat more than smaller data buffers, although memory costs are relatively small. Wireless data transmission rates can be relatively costly, so a desire for larger data sets for diagnostic purposes is at odds with a desire for smaller data sets to control wireless data transmission expenses. Exemplary studies have indicated that useful amounts of data can be acquired using a data buffer of 128 MB to 256 MB, with transmitted data packets being less than about 50 kilobytes per anomaly, though such values are exemplary, rather than limiting.

In a block 12, the data link is used to convey the anomaly (i.e., vehicle data that is identified as non-standard, or anomalous, which in an exemplary, but not limiting embodiment, is represented by a fault code, which is a numeric or alphanumeric value corresponding to a predefined fault condition) and the contents of the data buffer (in some embodiments the entire contents of the data buffer is sent, whereas in other embodiments less than the entire contents of the data buffer is sent along with the anomaly) to a remote computing device for analysis. It should be understood that the fault code and contents of the data buffer (in which operational data are stored) may be sent to more than one remote computing device before analysis of the data is implemented. For example, in an exemplary but not limiting embodiment, the fault code and contents of the data buffer are wirelessly conveyed from the vehicle (in real-time) to a computing device (which may be a network of linked devices as opposed to a single computing device) operated by the vehicle owner or a vendor providing a service to the vehicle owner. The data is stored therein, and then conveyed to a different remote computing device (which itself maybe a network of linked devices as opposed to a single computing device) operated by a vendor providing diagnostic services to the vehicle owner.

In a block 14, a processor at a remote location is used to analyze the fault code (or other data defining the detected anomalous or non-standard data) and the contents of the data buffer conveyed from the vehicle to identify a cause of the anomaly. In an optional block 16, the processor at the remote location may request additional data from the vehicle to facilitate the analysis or to confirm a diagnosis. In some embodiments, the additional data is the contents of the data buffer at a subsequent time interval, while in other embodiments the additional data is specifically defined data that the vehicle collects and conveys.

Figure 2:
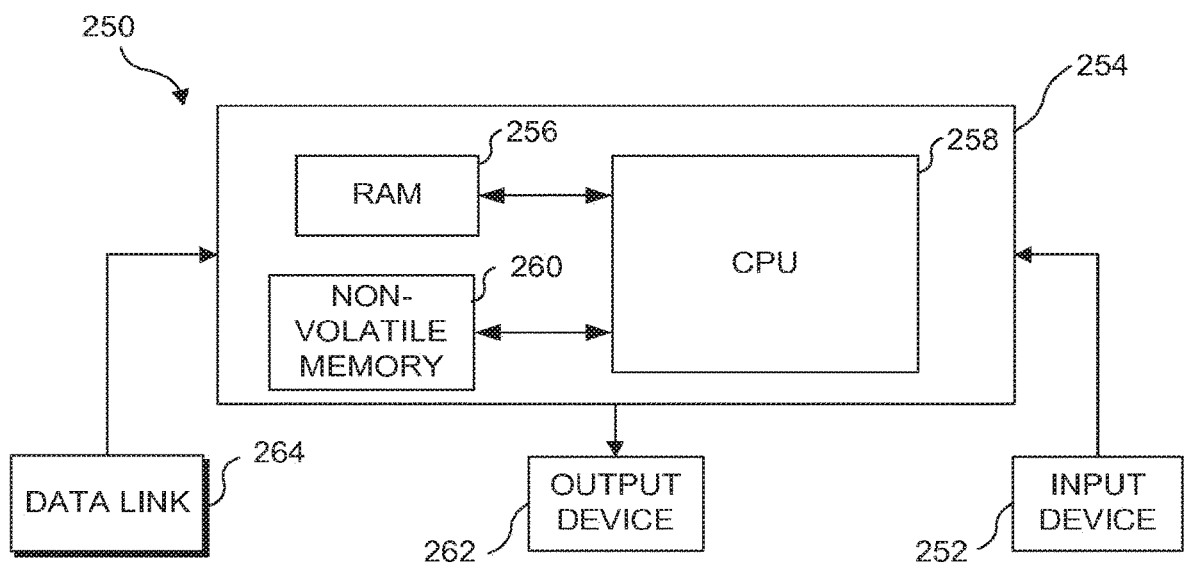
FIG. 2 is a functional block diagram of an exemplary computing device that can be employed to implement some of the method steps disclosed herein.

In general, the analysis of the fault code/anomaly and the contents of the data buffer will be carried out by a remote computing device. The remote computing device in at least one embodiment comprises a computing system controlled by the operator of the vehicle, while in other exemplary embodiments the computing system is controlled by a third party or vendor who manages the diagnostic service for the operators of the enrolled vehicles (in some embodiments, the third party bills the vehicle operators a subscription fee). The remote computing device can be operating in a networked environment. FIG. 2 schematically illustrates an exemplary computing system 250 suitable for use in implementing the method of FIG. 1 (i.e., for executing at least block 14 of FIG. 1, and in some embodiments block 16 as well). Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis data collected from enrolled vehicles, to diagnose a mechanical fault (or other vehicle anomaly). The machine instructions implement functions generally consistent with those described above with respect to block 14 of FIG. 1. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory are an operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., to analyze performance data from a vehicle to detect a mechanical or other fault). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. Data link 264 is configured to enable vehicle anomaly data and buffered operational data collected in connection with operation of enrolled vehicles to be input into computing system 250 for analysis to determine a cause of the anomalous data. Those of ordinary skill in the art will readily recognize that many types of data links can be implemented, including, but not limited to, universal serial bus (USB) ports, parallel ports, serial ports, inputs configured to couple with portable memory storage devices, Fire Wire ports, infrared data ports, wireless data communication such as Wi-Fi and Bluetooth™, network connections via Ethernet ports, and other connections that employ the Internet. Note that vehicle data from the enrolled vehicles will be communicated wirelessly, either directly to the remote computing system that analyzes the data to diagnose the anomaly, or to some storage location or other computing system that is linked to computing system 250. In at least one embodiment, the vehicle anomaly data and buffered operational data collected in connection with operation of enrolled vehicles is wirelessly transmitted in a compact binary format to a first server, where the data is converted to a different format for transmission to a second server over a computer network, such as the Internet. In at least one embodiment, the second format is XML.

It should be understood that the term remote computer and the term remote computing device are intended to encompass networked computers, including servers and clients, in private networks or as part of the Internet. The buffered operational data and anomaly defining data can be stored by one element in such a network, retrieved for review by another element in the network, and analyzed by yet another element in the network. In at least one embodiment, a vendor is responsible for diagnosing the operational data and anomaly defining data, and clients of the vendor are able to access and review such data, as well as any resulting diagnoses. While implementation of the method noted above has been discussed in terms of execution of machine instructions by a processor (i.e., the computing device implementing machine instructions to implement the specific functions noted above), the method could also be implemented using a custom circuit (such as an application specific integrated circuit).

Figure 3:
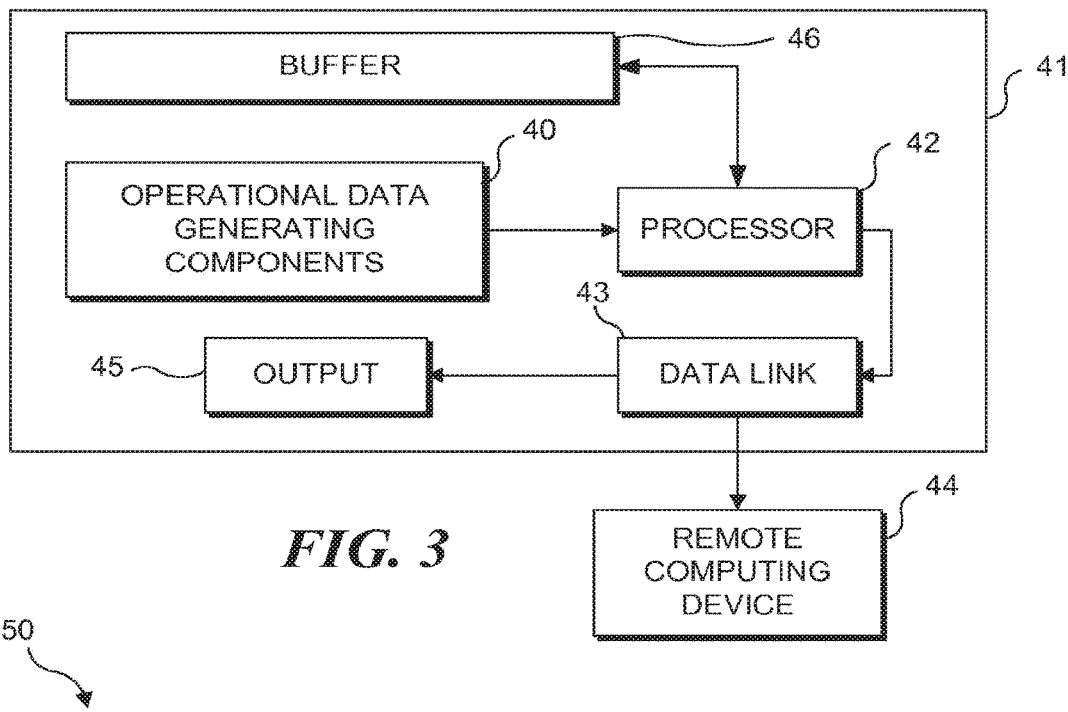
FIG. 3 is a functional block diagram of an exemplary vehicle employed to implement some of the concepts disclosed herein.

FIG. 3 is a functional block diagram of exemplary components used in vehicles enrolled in the vehicle diagnostic service, which are used in each enrolled vehicle 41 to implement some of the method steps shown in FIG. 1. An exemplary vehicle diagnostic service is based on adding a data buffer 46 and a bi-directional data link 43 to each enrolled vehicle. In an exemplary embodiment, this data link is a combination RF transmitter and receiver, although separate transmitters and receivers could be used. If the vehicle does not already include operational data collecting components 40, such components are added. As discussed above, most vehicles manufactured today include such operational data collecting components already, as many of today's vehicles are designed to use such continuously generated operational data to control operation of the vehicle in real-time, and such vehicle generally include data collecting components, data buses, and controllers that use the operational data to control the operation of the vehicle. The vehicle includes at least one processor 42 that performs the functions of temporarily storing operational data from components 40 in data buffer 46, detecting an anomalous condition in the vehicle, and in response to detecting such an anomaly, using bi-directional data link 43 to convey real-time anomaly data and the buffered operational data from the enrolled vehicle to a remote computing device 44 (which is used to determine or diagnose a cause for the detected anomaly). It should be understood that those processor functions can be implemented by a single processor, or distributed across multiple processors. As shown in FIG. 3, data from the vehicle is read by the microcontroller implementing processor 42 before moving into buffer 46, as is as would be typical of using a microcontroller to read data from most any data connection. In an exemplary, but not limiting embodiment, the data buffer, data link, and processor responsible for triggering the transmission of buffered data to the remote computing device are combined into a single component.

In some embodiments, an output 45 is also included, to provide diagnostic related information to the driver in a form that can be easily understood by the driver. Output 45 can be implemented using one or more lights (for example, a red light can be used to indicate that a problem has been detected which requires the operator to stop the vehicle, or to modify vehicle operations (for example, to slow down or otherwise reduce a load being placed on the vehicle until a repair can be made), using a speaker providing an audible output, and using a display providing a visual output. Note that output 45 can be combined into a single component with the data buffer and the data link, so only a single additional component is added to the vehicle (recognizing that most vehicles already include the additional required components, such as the operational data collecting components and the processor, although in at least some embodiments an additional processor is added to the vehicle to control the triggering of the transmission of buffered operational data to the remote computing device).

The concepts disclosed herein are in at least some embodiments intended to be used by fleet owners operating multiple vehicles, and the anomaly defining data and buffered operational data conveyed to the remote location for diagnosis will include an ID component that enables each enrolled vehicle to be uniquely identified.

Figure 4:
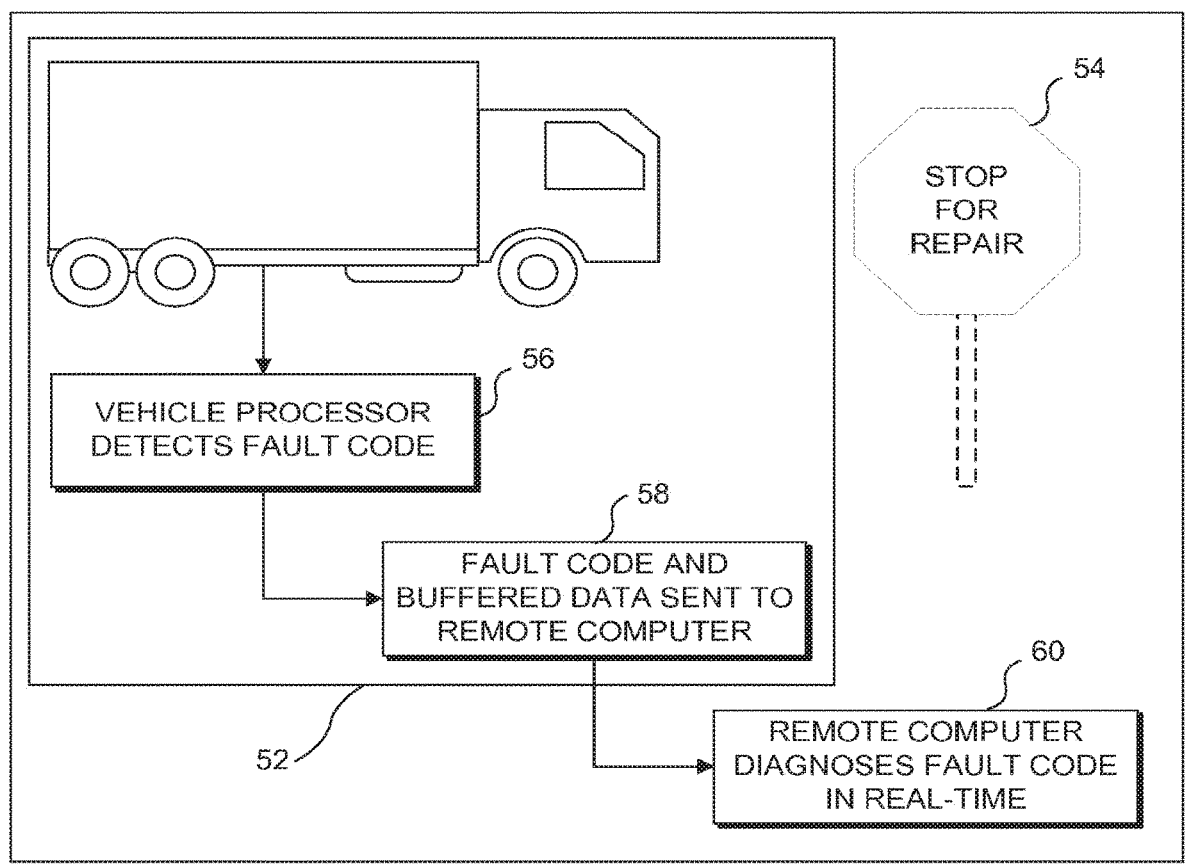
FIG. 4 is an exemplary functional block diagram showing the basic functional components used to implement the method steps of FIG. 1.

FIG. 4 is a functional block diagram of an exemplary system 50 that can be employed to implement the method steps of FIG. 1. The components include at least one enrolled vehicle 52 (including the components discussed above in connection with FIG. 3), an optional repair facility 54, a processor component 56 (in the vehicle) to implement the function of detecting an anomalous condition (such as detecting a fault code), a processor component 58 (also in the vehicle) to implement the function of conveying the fault code (or other data defining the detected anomaly) and contents of the operational data buffer to a remote location, and a remote processor component 60 to implement the function of analyzing the fault code (or other data defining the detected anomaly) and contents of the data buffer conveyed from the vehicle to determine a cause for the anomaly. Note that processor component 56 and 58 can be the same, or different processors in the vehicle.

Figure 5:
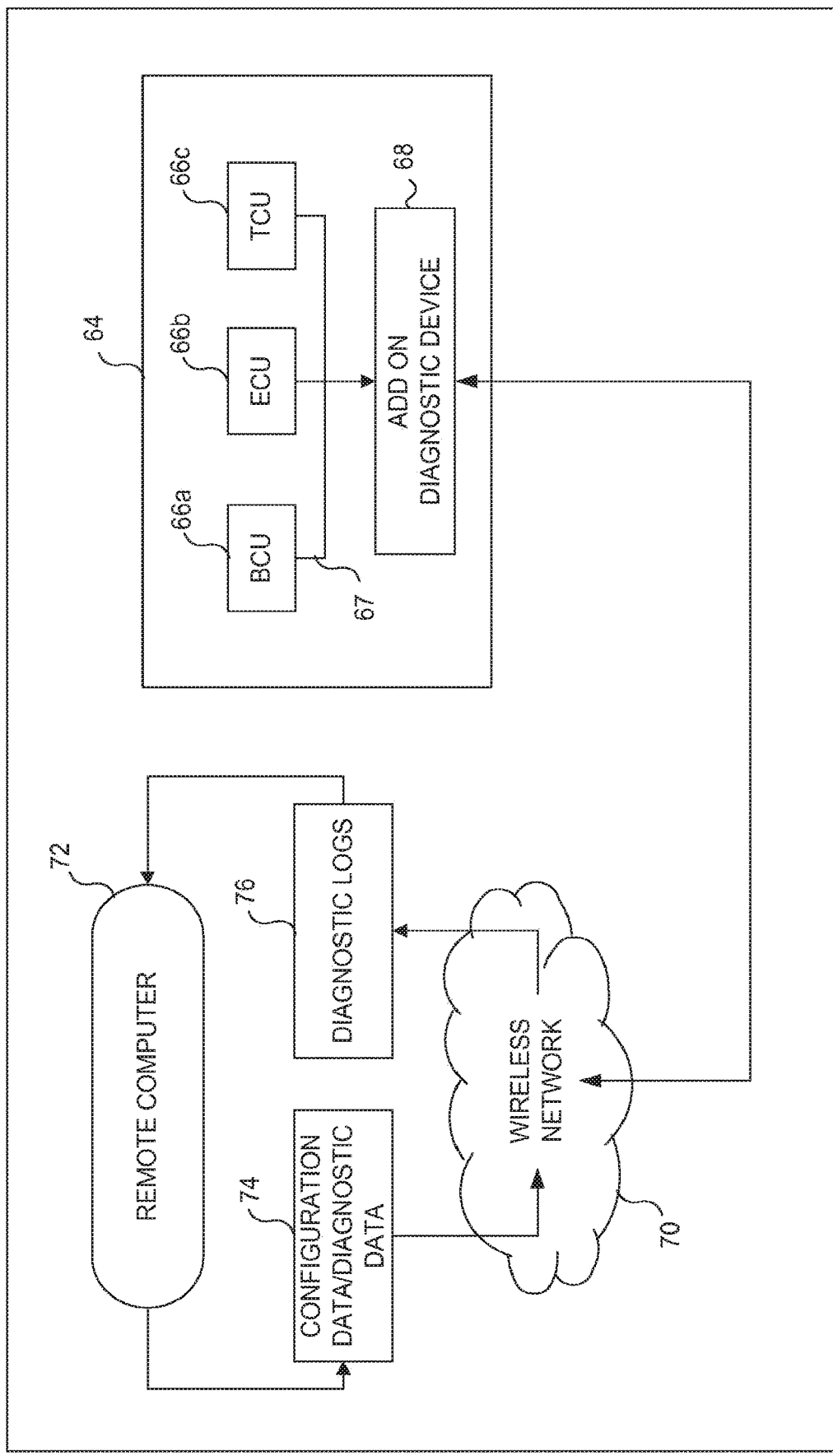
FIG. 5 is another exemplary functional block diagram showing the basic functional components used to implement the method steps of FIG. 1.

FIG. 5 is another functional block diagram showing the components of a vehicle diagnostic system in accord with the concepts disclosed herein, where the data link and data buffer are combined into a single component to be added to a vehicle to enable the vehicle to participate in the diagnostic program.

In the diagnostic system embodiment of FIG. 5, a system 62 includes a vehicle 64 and a remote computing device 72 for performing diagnostic analysis on data supplied by the vehicle over a wireless network 70. Vehicle 64 includes a plurality of components for collecting operational data, including a brake control unit 66a, an engine control unit 66b, and a transmission control unit 66c, each of which transmit operational data along a data bus 67. While only a single data bus is shown, it should be understood that multiple data buses could be employed. Further, a vehicle controller/processor, such as is shown in FIG. 3, is not illustrated in FIG. 5, but one or more such elements will be coupled to the data bus to receive and use operational data generated by the vehicle. Vehicle 64 also includes an add-on diagnostic unit 68, which combines a data buffer, a data link, and a processor implementing one or more of the functions associated with processor components 56 and 58 of FIG. 4 into a single device (noting that the vehicle's own processors could also be configured to implement such functions, particularly the function of detecting an anomalous condition, if desired).

Diagnostic unit 68 conveys diagnostic logs 76 from vehicle 64 to remote computer 72 via wireless network 70, generally as discussed above. Diagnostic logs 76 include an identified anomaly (such as a fault code) and data stored in the data buffer portion of diagnostic unit 68. Remote computer 72 analyzes the diagnostic logs to determine a cause of the anomaly. Remote computer 72 conveys data 74 (which includes one or more of configuration data and diagnostic data) to diagnostic device 68 via the wireless network. The configuration data is used to modify the functions implemented by the processor in diagnostic unit 68. Modifications includes, but are not limited to, changing the amount of operational data to be stored in the data buffer, changing an amount of operational data collected before an anomaly that is conveyed to the remote computing device, changing an amount of operational data collected after an anomaly that is conveyed to the remote computing device, changing a type of operational data that is conveyed to the remote computing device (this enables the remote computing device to request specific types of operational data after a diagnostic log has been received, to facilitate diagnosing the anomaly), and changing a definition of what constitutes an anomaly. The diagnostic data includes data conveyed to the operator of the vehicle, informing the operator of what actions the operator needs to take in response to the diagnosis. Such diagnostic data can include instructions to cease vehicle operations as soon as possible to avoid unsafe or damaging conditions, instructions to proceed to a designated repair facility, and/or instructions to proceed with a scheduled route, and to wait to repair the vehicle when the route is complete.

In an exemplary embodiment, diagnostic device 68 is implemented by using a hardware device installed onboard medium and heavy duty (Class 5-8) vehicles that is permanently or temporarily installed, powered from onboard vehicle power systems, connected to the in-vehicle diagnostic data communications network, capable of collecting diagnostic data from the vehicle data communications network and sending it to an off board server. The specific information to be acquired from the vehicle communications data link is remotely configurable. The specific data messages that trigger a data collection event are also remotely configurable. Data transmission from the vehicle includes a wireless interface between the vehicle and the off board server, such as a cellular modem or other similar wireless data transmission method. Data received at the off board server may then be forwarded to any defined set of consumers for the diagnostic information to be remotely analyzed and acted upon.

The components of system 62 include the hardware device used to implement diagnostic device 68, hardware programming (firmware), the wireless network, and the remote computing device (such as a computer server/data center). System 62 operates by using the remote computing device to transmit programming/configuration data to the in-vehicle device (i.e., diagnostic device 68) via the wireless network. During vehicle operation, the diagnostic data device stores operational data to include with all diagnostic log events (i.e., with each fault code or detected anomaly). In an exemplary but not limiting embodiment, the diagnostic log conveyed to the remote computing device from the vehicle includes data such as a diagnostic log file revision, a diagnostic log file type, a device ID, a configured time interval defining the extent of buffered operational data, and the number of parameters to be stored in the diagnostic log files. The diagnostic data device in the vehicle performs the functions of: storing a list of diagnostic parameters to be monitored and recorded from the vehicle data link at regular periodic intervals; storing a list of event parameters to trigger diagnostic data capture; and storing a time interval for diagnostic parameter recording. In an exemplary but not limiting embodiment, the diagnostic data device is connected to an in-vehicle data link (e.g., a 11939 bus) and vehicle power connections.

During vehicle operation, while the vehicle data link communication is active, the diagnostic data device is continuously monitoring for specific data messages configured to trigger the collection of diagnostic log files. Once diagnostic log files are recorded, they are transmitted via the wireless network to the remote computing device. Diagnostic log files are moved from the data center server within minutes to a destination server where the data may be analyzed and/or distributed for further action.

In an exemplary, but not limiting embodiment, the diagnostic log sent to the remote computing device includes one minute worth of operational data collected both before and after the anomalous event.

In an exemplary, but not limiting embodiment, the diagnostic log sent to the remote computing device includes the following types of operational data: any user defined fault code that has been detected, any vehicle manufacturer defined fault code that has been detected, a position of the vehicle at the time the fault code is detected (if the vehicle includes a position sensor), trip start and end times, odometer value and source address, engine hours and source address, power take off (PTO) hours and source address, total fuel and source address, idle fuel and source address, PTO Fuel and source address, VIN and source address, and trip fuel economy calculated from odometer and total fuel values listed above. It should be understood the processor in the vehicle configured to assemble the vehicle data (including buffered operational data and data defining the anomaly that was detected) to be uploaded to the remote computing can be configured to always send the same types of data to the remote computing device for each anomaly detected, or the processor can be configured to send specific types of data to the remote computing device based on the anomaly detected. For example, assume that the following types of data are available (either in the buffered operational data, or accessible to the processor): brake temperature data, oil temperature data, fuel level data, engine hour data, coolant temperature data, and tire pressure data (such types of data being exemplary, and not limiting). In some embodiments, regardless of the type of anomaly detected, all available data types are sent to the remote computing device. In other embodiments, only a subset of the most likely relevant data is sent to the remote computing device (for example, if the anomaly deals with brakes, then brake temperature data and tire pressure data is sent, but other types of data having less to do with the vehicle braking system are not sent to the remote computing device).

In an exemplary, but not limiting embodiment, the diagnostic device in the vehicle can be remotely configured to redefine the parameters used to generate a diagnostic log. The diagnostic log generated by the diagnostic device includes two primary components; at least some of the operational data temporarily stored in the data buffer, and data defining the anomaly (in some embodiments, fault codes are used to define the anomaly). The diagnostic device can be remotely reconfigured to change an amount of buffered operational data acquired before the anomaly that is included in the diagnostic log. The diagnostic device can be remotely reconfigured to change an amount of buffered operational data acquired after the anomaly that is included in the diagnostic log. The diagnostic device can be remotely reconfigured to change the type of operational data that is included in the diagnostic log (in the terms of FIG. 5, the diagnostic device can be remotely reconfigured to selectively determine whether data from brake control unit 66*a*, data from engine control unit 66*b*, and/or data from transmission control unit 66*c* should be included in the diagnostic log, noting that such operational data generating components are exemplary, and not limiting). The diagnostic device can also be remotely reconfigured to define what constitutes an anomaly that triggers sending a diagnostic log to the remote computing device for diagnosis. As discussed above, fault codes defined by the vehicle manufacturer can be considered to be anomalies that will trigger conveying a diagnostic log to the remote location. It should also be recognized that the concepts disclosed herein encompass enabling the diagnostic device to be remotely reconfigured to define a single parameter or a set of parameters (beyond the parameters used by manufacturers to define fault codes) that will trigger the conveyance of diagnostic log to the remote location. For example, regardless of the parameters used to define preset fault codes, the diagnostic device can be remotely reconfigured to generate and convey a diagnostic log to the remote location in response to detecting any specified parameter or set parameters.

Figure 6:
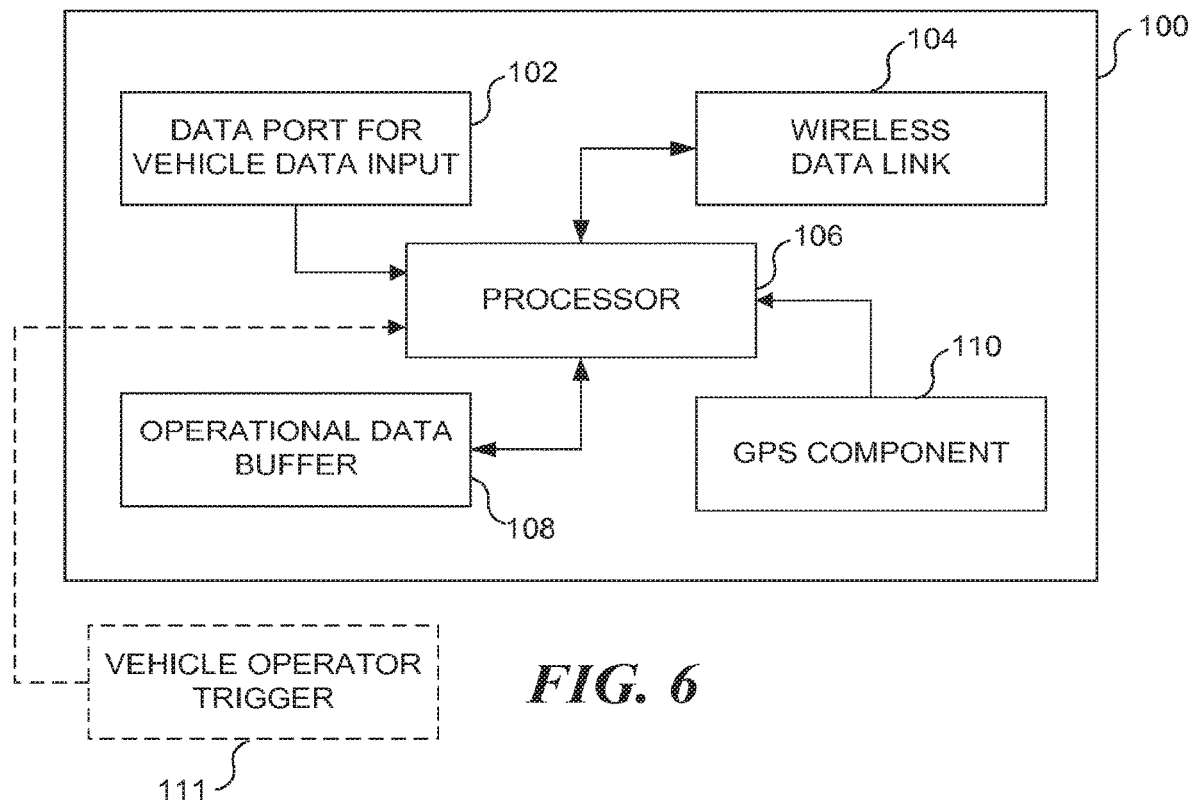
FIG. 6 is a functional block diagram of an exemplary diagnostic unit including a position sensing component that can be added to a vehicle to implement some of the concepts disclosed herein.

The concepts disclosed herein also encompass embodiments in which a the data buffer, the data link to the remote computing device, and the processor for detecting the anomalous condition are incorporated into a diagnostic or telematics device also including a position tracking component (such as a GPS component, recognizing that other position sensing technologies can be similarly employed). FIG. 6 is a functional block diagram of an exemplary diagnostic unit including a position sensing component that can be added to a vehicle to implement some of the concepts disclosed herein. A diagnostic (or telematics) unit 100 includes at least one data port 102 enabling vehicle operational data to be input into unit 100 (in an exemplary, but not limiting unit, a port for 11939 data and a port for 11708 data are provided, recognizing that such types of data are exemplary, and not limiting), a buffer 108 where operational data is temporarily stored, a GPS component 110 for determining vehicle location (which, as discussed below, can in certain embodiments be used to influence when the contents of the data buffer is transmitted to the remote computing device for analysis), a wireless data link 104 for sending operational data in the buffer to the remote computing device for analysis of an anomalous condition, and a processor 106 (for implementing at least the function of causing the buffered operational data to be conveyed via the data link to a remote computing device when an anomalous condition is detected).

FIG. 6 also shows an optional operator trigger 111, that an operator of the vehicle can actuate to cause processor 106 to use the data link to send the contents of the buffer to the remote computing device. In this case, the operator is determining that some anomalous condition has occurred which should be investigated. Perhaps the driver feels an odd vibration, hears an odd engine noise, or otherwise perceives some abnormal condition. The trigger 111 is coupled to controller 106, which is configured to respond by sending the buffered operational data to the remote computing device. In such circumstances, the processor in the vehicle tasked with monitoring the operational data to detect an anomalous condition may not have detected such an anomalous condition, in which case only the buffered operational data will be conveyed to the remote computing device (i.e., data defining the anomalous condition will not be present, thus will not be sent to the remote computing device). In such a data transmission of buffered operational data, an indication that the operator of the vehicle triggered the data transmission can be included, so the analysis of the buffered operational data at the remote computing device can proceed with the understanding that the operator of the vehicle suspects a problem exists, even if an anomalous condition has not be detected at the vehicle by the vehicle hardware monitoring the operational data for such an anomalous condition. Trigger 111 can be implemented with a dedicated user input device (only used to trigger sending the contents of the data buffer to the remote computing device), or an existing operator input element is modified to support such a triggering function. For example, a control device used to control vehicle equipment such a headlight or radio can be used as a trigger, if the processor controlling the transmission of the buffered operational data is coupled to the control device, and configured to respond to a certain input pattern from the control device (i.e., the control device is manipulated by the operator in a predefined and unusual pattern, such as repeatedly manipulating the control device in a specific and unusual sequence not normally employed in routine vehicle operations).

Buffer 108 can be implemented as a first in, first out buffer that temporarily stores the operational data generated by the vehicle in normal operation, which conventionally is generated and discarded rather than being saved. Buffer 108 is intended to be relatively small, and not intended to attempt to archive all of the operational data generated by the vehicle for an extended period of operation. Rather, buffer 108 is intended to store relatively small, but still useful amounts of operational data. In an exemplary, but not limiting embodiment, the amount of operational data stored in buffer 108 represents seconds or minutes of data, rather than hours or days of data. In an exemplary, but not limiting embodiment, buffer 108 is implemented using flash memory, of less than a gigabyte. With memory prices dropping regularly, more operational data could be stored. However, wireless transmission of data represents a cost, and in at least one embodiment a balance between the amount of data collected (more data leading to better diagnoses) and the amount of data wirelessly transmitted (less data being transmitted meaning less cost) is sought. Empirical studies have indicated that useful amounts of data can be obtained using a buffer of 256 MB or less and data transmissions of less than about 30 kilobytes per anomaly.

Processor 106 implements at least the function of using the data link to send the contents of the buffer (or at least a portion of the contents) to the remote computing device when an anomalous event occurs. In some embodiments, processor 106 implements additional functions. In at least one embodiment, processor 106 analyzes the operational data to detect specific conditions that have been predetermined to represent an anomaly that should trigger the transmission of the buffer to the remote computing device. In at least some embodiments, the data link can be used to enable changes to be made to the logic used by the processor to determine what represents an anomaly.

In some embodiments, a different processor (i.e., not processor 106) in the vehicle is determining when an anomalous condition occurs. For example, any processor in a vehicle that generates a fault code based on specific operational data can be configured to send that fault code to processor 106, so that processor 106 responds by using the data link to send the fault code and the contents of the data buffer to the remote computing device.

Figure 7:
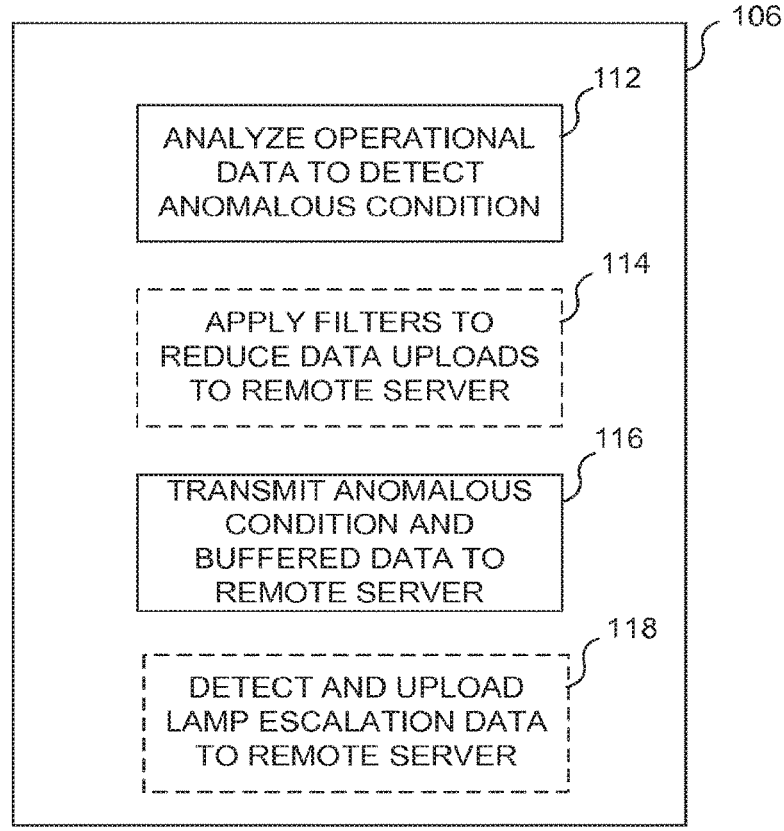
FIG. 7 is a functional block diagram of exemplary processor functions that can be implemented in the diagnostic unit of FIG. 6.

FIG. 7 IS a functional block diagram of exemplary processor functions that can be implemented in the diagnostic unit of FIG. 6. A block 112 corresponds to the function of analyzing the operational data generated by the vehicle to detect an anomalous condition. This function is generally implemented when parameters other than manufacturer designated fault codes (which are generally detected by other processors in the vehicle) are used to define an anomaly. A block 114 refers to the function of applying specific logic (i.e., a filter) to reduce an amount of data that might otherwise be sent to the remote computing device, as will be discussed below). A block 116 refers to the function of using the data link to send the buffered operational data to the remote computing device based on a trigger event (such as an operator trigger, a fault code detected by some other processor, or an anomalous condition detected by processor 106). A block 118 refers to the function of using the data link to send lamp escalation data to the remote computing device after buffered operational data corresponding to a previously detected anomalous condition has been sent, in the event that an indicator lamp has changed status since the anomalous event (this function is discussed in detail below). In FIG. 7, blocks 112, 116, and 118 are shown in dashed lines, as such functions can be considered optional, and such functions are not implemented in all embodiments.

As noted above, block 114 refers to the function of applying specific logic (i.e., one or more filters) to reduce an amount of data that might otherwise be sent to the remote computing device. In some embodiments, such logic is implemented to reduce an amount of buffered operational data conveyed to a remote computing device for analysis, as a cost control function. The concepts disclosed herein encompass a variety of filtering techniques that can be used to determine if a particular condition exists, such that when such a predefined condition exists, the buffered operational data will not be sent to the remote computing device, even if an anomalous condition is detected. One such filtering technique is based on detecting (using GPS component 110) a location of the vehicle at startup. If that location corresponds to a repair facility or service center, then the automated buffered operational data transmission functionality can be turned off (as the vehicle will likely be coupled to a diagnostic device at the service center, such that the remote diagnostic function is not needed). Such locations can be stored in a memory at the vehicle, or more preferably, the vehicle can communicate its location at start up to the remote computing device, which has access to the locations of such service centers. The remote computing device then determines if processor 106 should be instructed (via data link 104) not to transmit the buffered operational data to the remote computing device even if an anomaly is detected. Another such filter technique is based on analyzing whether the same anomalous conditions are being detected in about the same geographic position and/or within a predefined time period (which can indicate that the vehicle is being driven around a service facility trying to replicate an intermittent fault). In one embodiment, controller 106 is configured to not to transmit the buffered operational data to the remote computing device even if an anomaly is detected, if the vehicle remains within a relatively small geographical area (i.e., within five miles or so, such an area being exemplary and not limiting) in a predefined period of time (such as 24 hours, again recognizing that the specified interval is exemplary, and not limiting). Another technique that can be used to reduce the amount of buffered operational data that is wirelessly conveyed to a remote computing device is to ensure that duplicate information, related to the same anomalous condition, is not sent time and time again. In at least one embodiment, an occurrence counter in a diagnostic trouble code (DTC) generated in the vehicle is analyzed to determine if a particular fault code is a reoccurring event that can be ignored to minimize an amount of data that is transmitted wirelessly to the remote computing device for analysis. Processor 106 can be configured to send repeating fault codes/anomalies, when the re-occurring anomaly is accompanied by a new anomaly.

The concepts disclosed herein also encompass embodiments in which processor 106 is configured to either ignore operational data generated during an initial startup of the vehicle (referred to as settling time). During initial vehicle startup, as various components in the vehicle initialize, what otherwise might appear to be anomalous operating conditions may briefly exist. In general, such conditions rapidly disappear as vehicle components operate for more than several seconds. In an exemplary, but not limiting embodiment, controller 106 is configured to ignore, or not to store, about the first ten seconds of operational data that is generated upon vehicle startup. Vehicle startup can also present the unusual condition where the data buffer may not have filled to capacity. Assume the data buffer is configured to store 90 seconds of operational data, and an anomalous condition is detected 45 seconds after operational data began to fill up the buffer. Controller 106 can be configured to send only the 45 seconds present in the buffer, or can be configured to not transmit any portion of the buffer, if the buffer is not full, depending on the logic one wishes to employ. Partial data is likely to be more useful than no data, so the former technique is more likely to be implemented.

As noted above, block 118 refers to the function of using the data link to send lamp escalation data to the remote computing device after buffered operational data corresponding to a previously detected anomalous condition has been sent, in the event that an indicator lamp has changed status since the anomalous event. In at least one embodiment, processor 106 is configured to monitor dashboard lamps, to determine if any warning indicator lamps on the vehicle dashboard change in response to the recently detected anomalous condition. When such a lamp status change (i.e., from off to on, or from amber/yellow to red, indicating an escalation) is detected, processor 106 is configured to use data link 104 to send information defining the change in the lamp status to the remote computing device. Depending on the vehicle, the fault code data may include lamp status, but that information is not necessarily accurate, and even when accurate the buffered operational data may not capture a change in lamp status that occurs at a time point after the anomaly has occurred. In general, this lamp escalation logic pertains only to the same fault or anomaly. If there were a fault code such as (SrcAddr=3, SPN=111, FMI=1 and lamp state=all off) followed by the same SrcAddr,SPN,FMI and a different lamp state, then the lamp escalation logic component in processor 106 would send the new lamp state to the remote server/computing device via the data link. If the SrcAddr, SPN, FMI are different, then a new fault entry is created and buffered operational data pertaining to the new fault/anomaly and data defining the new anomaly are sent to the remote computing device.

It should be recognized that processor 106 can be implemented via hardware (such as an application specific integrated circuit implementing fixed logical steps), or a controller implementing software (i.e., a series of logical steps). Processor 106 can be a single component, or different functions described above that are implemented by processor 106 can be distributed across multiple processors.

In at least one embodiment, processor 106 is configured to include data from GPS component 110 with the buffered operational data, when such data is conveyed to the remote computing device via data link 104.

Figure 8:
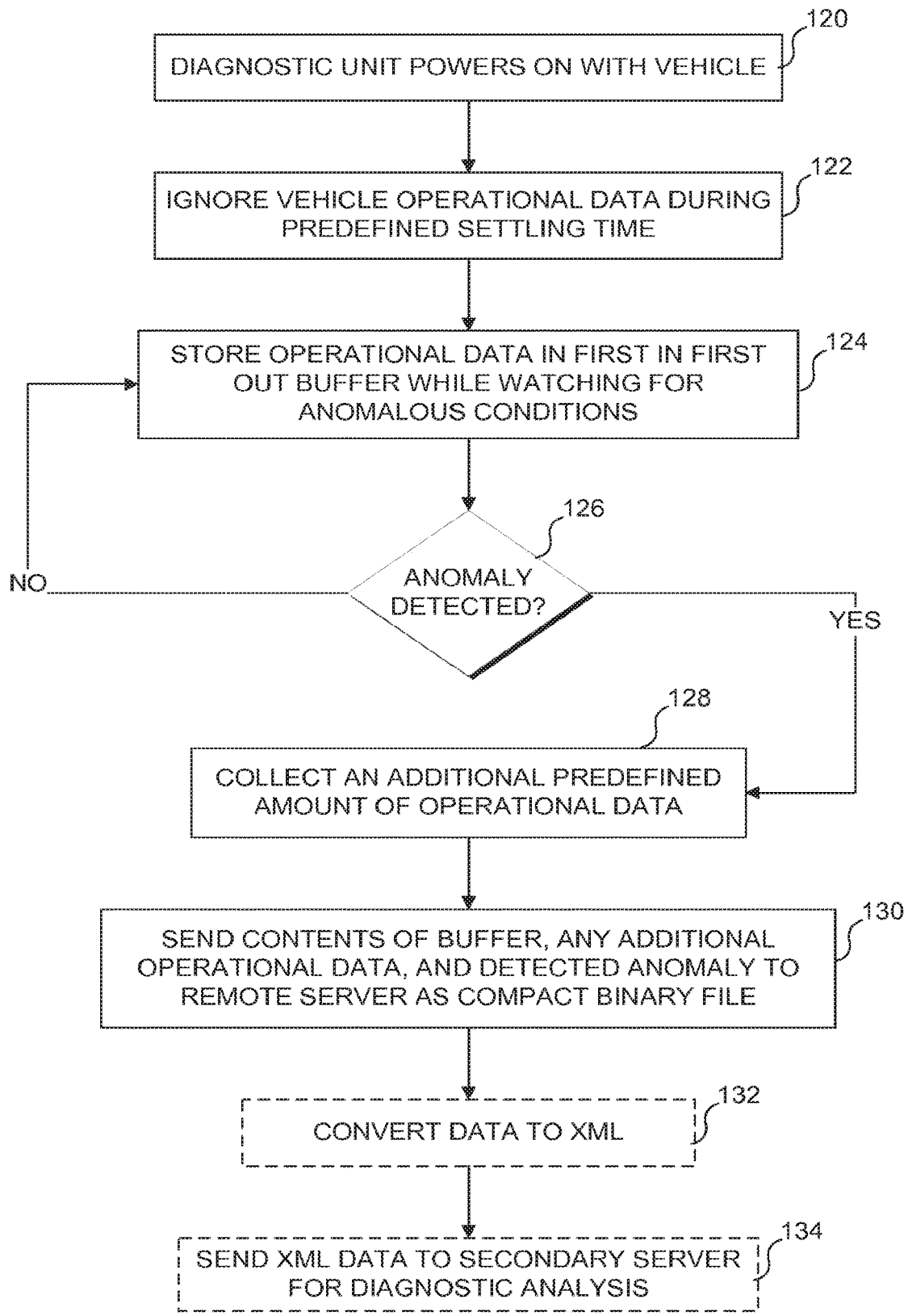
FIG. 8 is a flow chart showing exemplary steps implemented in accord with the concepts disclosed herein to remotely diagnose an abnormal vehicle parameter in real-time, the method of FIG. 8 including some additional functions as compared to the method of FIG. 1.

FIG. 8 is a flow chart showing exemplary steps implemented in accord with the concepts disclosed herein to remotely diagnose an abnormal vehicle parameter in real-time, where the method of FIG. 8 includes some additional functions as compared to the method of FIG. 1. Note that FIG. 8 is discussed in terms of diagnostic unit 100 of FIG. 6, but it should be recognized that the steps of FIG. 8 could be implemented in embodiments having different configurations than the diagnostic unit of FIG. 6. In a block 120, diagnostic unit 100 of FIG. 6 powers on. In a block 122, operational data generated during an initial settling period (generally measured in seconds, an exemplary settling period being 10 seconds, with the understanding that such a time period is exemplary, and not limiting) is ignored. In some embodiments, any fault codes or anomalous events occurring in the settling period are also ignored. In some embodiments, operational data in the settling period can be stored in the data buffer, but fault codes or anomalous events in the settling period are ignored, such that no operational data is sent to the remote computing device until after the settling period has elapsed. In a block 124, operational data is stored in a first in, first out buffer. In a decision block 126, at least one processor in the vehicle (which in some embodiments is processor 106 of FIG. 6, while in other embodiments is a different processor in the vehicle, such as a vehicle processor normally tasked with identifying fault codes) determines if an anomalous event has occurred (either by monitoring the operational data itself, or by waiting for a fault code or anomalous condition to be detected by some other vehicle processor). If not, operational data in the data buffer is continuously updated (for example, for each new second of new data added to the buffer, the oldest second of data is discarded, recognizing that the stated one second intervals being added/discarded is exemplary, and not limiting). If in decision block 126 an anomaly has been detected, then processor 106 takes the contents of the buffer, collects an additional amount of operational data after anomaly is detected (in an exemplary embodiment, an additional 10-20 seconds of operational data is acquired, noting that such a time period is exemplary, and not limiting), and uses the data link to send the buffered operational data collected before and after the anomaly is detected, and data defining the anomaly, to the remote computing device. This data is sent as a compact binary file to minimize data transmission costs. In an optional block 132, the binary data file is translated into another format (such as XML), and then sent via a computer network to a secondary server for analysis, as indicated in a block 134. Blocks 132 and 134 are useful in embodiments where a first server where the data is originally received from the vehicle is operated by a first entity (such as an entity that collects and stores GPS data transmitted from the vehicle during routine vehicle operation (such data being collected even when no anomalous event is detected), and the buffered operational data and data defining the anomalous event are conveyed from the server/remote computing device operated by the first entity to a server/remote computing device operated by a second entity (the second entity being responsible for performing the service of diagnosing the buffered operational data to determine the cause of the anomaly).

Thus, the concepts disclosed herein encompass at least one embodiment implemented as a system in which diagnostic units such as those shown in FIG. 6 are included in a plurality of enrolled vehicles. Such a system includes a remote computing device (either an individual computing device, or a network of such devices), where the buffered operational data and the data defining the anomalous condition (such as a fault code) can be stored or analyzed (i.e., diagnosed). In one exemplary, but not limiting embodiment, vehicle position data and/or inspection data is collected from enrolled vehicles and stored at a first server, operated by a first entity, for use by the operator of the vehicles. Such data is collected during normal operation of the vehicle, and sent to the first server during normal operation of a vehicle. In the event that an anomalous condition is detected, the buffered operational data and the data defining the anomalous condition are sent from the vehicle to the first server. The first entity operating the first server then conveys the buffered operational data and the data defining the anomalous condition to a second server operated by a second entity. The second entity then analyzes the buffered operational data and the data defining the anomalous condition and determines the cause of the anomalous condition. The vehicle operator can then be contacted to arrange servicing of the vehicle. In an exemplary embodiment, the second entity is the manufacturer of the vehicle or the vehicle power plant.

The concepts disclosed herein further specifically encompass the following.

A first telematics unit for use in a vehicle, the telematics unit comprising: (a) a first data port for receiving operational data from the vehicle during operation of the vehicle; (b) a first in, first out buffer in which operational data is temporarily stored during operation of the vehicle; (c) a data link for wirelessly conveying data from the vehicle to a remote computing device; and (d) a processor configured to use the data link to send operational data from the buffer to the remote computing device when an anomalous condition is detected at the vehicle.

The first telematics unit described above, where the processor IS configured to include data defining the anomalous condition with the buffered operational data that is sent to the remote computing device.

The first telematics unit described above, where the processor is configured to send a predefined additional quantity of operational data collected after the anomaly is detected to the remote computing device, along with buffered operational data collected before the anomaly is detected.

The first telematics unit described above, where the processor is configured to analyze the operational data entering the buffer to detect the anomalous condition.

The first telematics unit described above, where the processor is configured to receive a notification from a different vehicle processor that is configured to detect the anomalous condition.

The first telematics unit described above, where the processor is configured to ignore anomalous conditions occurring during a predefined settling period after vehicle startup.

The first telematics unit described above, where the processor is configured to ignore anomalous conditions that have already been reported to the remote computing device.

The first telematics unit described above, where the processor is configured to send buffered operational data to the remote computing device based on a trigger signal received from a vehicle operator, even if an anomalous condition has not been detected.

The first telematics unit described above, where after buffered operational data has been sent to the remote computing device in response to the detection of an anomalous condition, the processor is configured to monitor a warning lamp status associated with the anomaly, and to use the data link to send lamp escalation data to the remote computing device when that warning lamp changes condition.

A second telematics unit for use in a vehicle, the telematics unit comprising: (a) a positioning sensing component for collecting geographical position data from the vehicle during vehicle operation, the geographical position data being time indexed; (b) a data port for receiving operational data from the vehicle during operation of the vehicle; (c) a first in, first out buffer in which operational data is temporarily stored during operation of the vehicle; (d) a data link for wirelessly conveying data from the vehicle to a remote computing device; and (e) a processor configured to use the data link to send operational data from the buffer to the remote computing device when an anomalous condition is detected at the vehicle.

The second telematics unit described above, where the processor is configured to include data defining the anomalous condition with the buffered operational data that is sent to the remote computing device.

The second telematics unit described above, where the processor is configured to send a predefined additional quantity of operational data collected after the anomaly is detected to the remote computing device, along with buffered operational data collected before the anomaly is detected.

The second telematics unit described above, where the processor IS configured to include geographical position data defining a location of the vehicle when the anomalous condition is detected with the buffered operational data that is sent to the remote computing device.

The second telematics unit described above, where the processor is configured to analyze the operational data entering the buffer to detect the anomalous condition.

The second telematics unit described above, where the processor is configured to receive a notification from a different vehicle processor configured to detect the anomalous condition.

The second telematics unit described above, where the processor is configured to ignore anomalous conditions occurring during a predefined settling period after vehicle startup.

The second telematics unit described above, where the processor is configured to determine a position of the vehicle at startup, and ignore anomalous conditions occurring while the vehicle's position is proximate to a known location where anomalous conditions should be ignored.

The second telematics unit described above, where the processor IS configured to determine a position of the vehicle at startup, then send a request to the remote computing device to determine if the position of the vehicle is proximate to a known location where anomalous conditions should be ignored, and if so, the processor is configured to ignore anomalous conditions occurring proximate that location.

The second telematics unit described above, where the processor IS configured to ignore anomalous conditions that have already been reported to the remote computing device.

The second telematics unit described above, where the processor is configured to send buffered operational data to the remote computing device based on a trigger signal received from a vehicle operator, even if an anomalous condition has not been detected.

The second telematics unit described above, where after buffered operational data has been sent to the remote computing device in response to the detection of an anomalous condition, the processor is configured to monitor a warning lamp status associated with the anomaly, and to use the data link to send lamp escalation data to the remote computing device when that warning lamp changes condition.

A system for detecting an anomalous condition with a vehicle and diagnosing that anomalous condition: (a) a vehicle comprising: (i) at least one sensor for generating vehicle operational data; (ii) a first in, first out buffer in which operational data is temporarily stored during operation of the vehicle; (iii) a data link for wirelessly conveying data from the vehicle to a remote location; and (iv) a processor configured to use the data link to send operational data from the buffer to the remote location when an anomalous condition is detected at the vehicle; and (b) a computing device at the remote location, the computing device being configured to implement the function of analyzing the buffered operational data received from the vehicle to diagnose the anomalous condition.

The system described above, where the computing device at the remote location IS configured to automatically alert the operator of the vehicle about the diagnosis. Such an alert can be conveyed using at least one of a text message, an email message, and an automated telephone message.

The system described above, where the processor in the vehicle is configured to include position data defining a location of the vehicle when the anomaly is detected with the data being conveyed to the remote computing device.

The system described above, where the processor in the vehicle is configured to ignore anomalies, and thus not send data to the remote computing device, for a predetermined period of time following vehicle startup.

The system described above, where the processor in the vehicle is configured to ignore anomalies when a location of the vehicle at startup corresponds to a predefined location. In some embodiments, each such predefined location is stored in the vehicle, while in other embodiments, upon startup the processor communicates with the remote computing device to determine if the vehicle's present location indicates that anomalies should be ignored.

The system described above, where the processor in the vehicle is configured to ignore anomalies that are repetitive.

The system described above, where the processor in the vehicle is configured to monitor lamp status associated with a previously detected anomaly, and if the lamp status of a warning lamp associated with that anomaly changes, the processor is configured to convey lamp escalation data to the remote computing device.

The system described above, where the processor in the vehicle is configured to convey buffered operational data to the remote computing device based on an operator trigger, even if no anomaly has been detected.

The system described above, where the computing device at the remote location is configured to automatically schedule a repair of the vehicle.

The system described above, where the computing device at the remote location is configured to automatically schedule a repair of the vehicle based on a current location of the vehicle using location data received from the vehicle with the buffered operational data.

The system described above, where the computing device at the remote location is configured to automatically order parts required to repair the vehicle.

The system described above, where the computing device at the remote location is configured to receive and store position data from the vehicle during normal operation of the vehicle, and when buffered operational data is received from the vehicle, the computing device automatically forwards the buffered operational data to a computing device operated by a different entity, the different entity performing the diagnosis. In such a system, the buffered operational data received by the first entity may require reformatting to a different data format, such as XML, before sending the data to the second entity for analysis.

A method for detecting an anomalous condition with a vehicle and diagnosing that anomalous condition, including the steps of: (a) storing operational data generated while operating a vehicle in a first in, first out buffer during operation of the vehicle; (b) detecting an anomalous condition; (c) using a data link to wirelessly convey buffered operational data from the vehicle to a remote location; and (d) analyzing the buffered operational data at the remote location to diagnose the anomalous condition.

The method described above, where a computing device at the remote location IS configured to automatically alert the operator of the vehicle about the diagnosis. Such an alert can be conveyed using at least one of a text message, an email message, and an automated telephone message.

The method described above, where a processor in the vehicle is configured to include position data defining a location of the vehicle when the anomaly is detected with the data being conveyed to the remote location.

The method described above, where a processor in the vehicle is configured to ignore anomalies, and thus not send data to the remote location, for a predetermined period of time following vehicle startup.

The method described above, where a processor in the vehicle is configured to ignore anomalies when a location of the vehicle at startup corresponds to a predefined location. In some embodiments, each such predefined location is stored in the vehicle, while in other embodiments, upon startup the processor communicates with a remote computing device to determine if the vehicle's present location indicates that anomalies should be ignored.

The method described above, where a processor in the vehicle IS configured to ignore anomalies that are repetitive.

The method described above, where a processor in the vehicle is configured to monitor lamp status associated with a previously detected anomaly, and if the lamp status of a warning lamp associated with that anomaly changes, the processor is configured to convey lamp escalation data to the remote computing device.

The method described above, where a processor in the vehicle is configured to convey buffered operational data to the remote computing device based on an operator trigger, even if no anomaly has been detected.

The method described above, where a computing device at the remote location is configured to automatically schedule a repair of the vehicle.

The method described above, where a computing device at the remote location is configured to automatically schedule a repair of the vehicle based on a current location of the vehicle using location data received from the vehicle with the buffered operational data.

The method described above, where a computing device at the remote location is configured to automatically order parts required to repair the vehicle.

The method described above, where a computing device at the remote location is configured to receive and store position data from the vehicle during normal operation of the vehicle, and when buffered operational data is received from the vehicle, the computing device automatically forwards the buffered operational data to a computing device operated by a different entity, the different entity performing the diagnosis. In such a method, the buffered operational data received by the first entity may require reformatting to a different data format, such as XML, before sending the data to the second entity for analysis.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A system, comprising:
   an onboard vehicle data collection device, the onboard vehicle data collection device including:
   a vehicle data bus interface to pass operational data generated by a plurality of vehicle-based sensor devices;
   a ring buffer arranged in a memory to store the operational data;
   a fault detection mechanism arranged to assert a fault code when data passed via the vehicle data bus indicates a predefined fault; and
   a wireless data link device, the wireless data link device arranged to communicate fault code data and a predetermined amount of operational data from the ring buffer to a first remote computing device, the predetermined amount of operational data including operational data associated with the asserted fault code and operational data not associated with the asserted fault code, wherein the predetermined amount of operational data includes a first amount of data that was stored in the ring buffer before the fault code was asserted and a second amount of data that was stored in the ring buffer after the fault code was asserted; and
   a first remote computing device at a first remote location and a second remote computing device at a second remote location, the first remote computing device being configured to forward the predetermined amount of operational data defining a detected anomalous condition and buffered operational data to the second remote computing device at the second remote location without analyzing the data,
   wherein the second remote computing device at the second remote location analyzes the detected anomalous condition and buffered operational data to determine if the detected anomalous condition and buffered operational data indicates a particular fault code data.

2. A system according to claim 1, wherein the data passed via the vehicle data bus indicates the predefined fault after at least one datum of the operational data crosses a threshold.

3. A system according to claim 1, wherein the ring buffer is a first-in, first-out buffer.

4. A system according to claim 1, wherein the ring buffer is arranged in at least 128 MB of the memory.

5. A system according to claim 1, wherein the ring buffer is arranged in no more than 256 MB of the memory.

6. A system according to claim 1, wherein the predetermined amount of operational data is a user-definable amount of data.

7. A system according to claim 1, wherein the predetermined amount of operational data is all of the operational data stored in the ring buffer.

8. A system according to claim 1, wherein the fault code corresponds to a fault code defined by a vehicle manufacturer.

9. A system according to claim 1, wherein the fault code corresponds to a user defined fault code.

10. A system according to claim 1, wherein at the remote computing device is arranged to communicate a plurality of fault codes and at least one threshold associated with each of the plurality of fault codes to the onboard vehicle data collection device.

* * * * *